US012634693B2

(12) United States Patent
Saghir et al.

(10) Patent No.: US 12,634,693 B2
(45) Date of Patent: May 19, 2026

(54) SYSTEMS AND METHODS FOR INTER-RADIO ACCESS TECHNOLOGY HANDOVER

(71) Applicant: Verizon Patent and Licensing Inc., Basking Ridge, NJ (US)

(72) Inventors: Amir Saghir, Frisco, TX (US); Ali Imdad Malik, East Brunswick, NJ (US); Said Hanbaly, Prosper, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 303 days.

(21) Appl. No.: 18/464,452

(22) Filed: Sep. 11, 2023

(65) Prior Publication Data

US 2025/0088852 A1    Mar. 13, 2025

(51) Int. Cl.
*H04W 12/08* (2021.01)
*H04W 36/08* (2009.01)
(52) U.S. Cl.
CPC ........... *H04W 12/08* (2013.01); *H04W 36/08* (2013.01)
(58) Field of Classification Search
CPC .............................. H04W 12/08; H04W 36/08
See application file for complete search history.

(56) References Cited

U.S. PATENT DOCUMENTS

2022/0272735 A1 *   8/2022   Miklós .................. H04W 72/00
2023/0362787 A1 *  11/2023   Ohlsson ................ H04W 48/18
2025/0081139 A1 *   3/2025   Barawkar ............... H04W 8/24

OTHER PUBLICATIONS

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 17)," 3GPP TS 36.300 V17.5.0 (Jun. 2023).
Third Generation Partnership Project, "Technical Specification Group Radio Access Network; Evolved Universal Terrestrial Radio Access Network (E-UTRAN); S1 Application Protocol (S1AP) (Release 17)," 3GPP TS 36.413 V17.1.0 (Jun. 2022).
Third Generation Partnership Project, "Technical Specification Group Radio Access Network; Evolved Universal Terrestrial Radio Access (E-UTRA); Radio Resource Control (RRC); Protocol specification (Release 17)," 3GPP TS 36.331 V17.5.0 (Jun. 2023).

(Continued)

*Primary Examiner* — Fabricio R Murillo Garcia

(57) ABSTRACT

A system described herein may receive a request for a User Equipment ("UE") to access a radio access network ("RAN"), which may implement a Closed Subscriber Group ("CSG") technique. The request may be a handover request from a different RAN, which may implement a different radio access technology ("RAT"). The system may determine that an access policy for the particular RAN does not indicate that the UE is authorized to access the RAN. The system may output a request to the RAN, including an indication that the access policy for the RAN does not indicate that the UE is authorized to access the RAN. The system may receive a response to the second request. The response may include an indication of whether the UE is allowed to access the RAN, as determined by the RAN based on one or more conditions in addition to an identifier of the UE.

20 Claims, 15 Drawing Sheets

(56) References Cited

OTHER PUBLICATIONS

Third Generation Partnership Project, "Technical Specification Group Core Network and Terminals; Allowed Closed Subscriber Group (CSG) list; Management Object (MO) (Release 17)," 3GPP TS 24.285 V17.0.0 (Mar. 2022).
Third Generation Partnership Project, "Technical Specification Group Radio Access Network; Mobility procedures for Home Node B (HNB); Overall description; Stage 2 (Release 17)," 3GPP TS 25.367 V17.0.0 (Mar. 2022).

* cited by examiner

601

| Access policy | RAN identifier |
|---|---|
| Allow unauthorized UEs under particular conditions | RAN_A |

MME
301

Base station
113-1

652

Inter-RAT handover request;
UE not authorized for RAN 105-1 (RAN_A)

654

Determine that particular conditions are met

656

658

Handover response (accept/acknowledge)

Proceed with handover

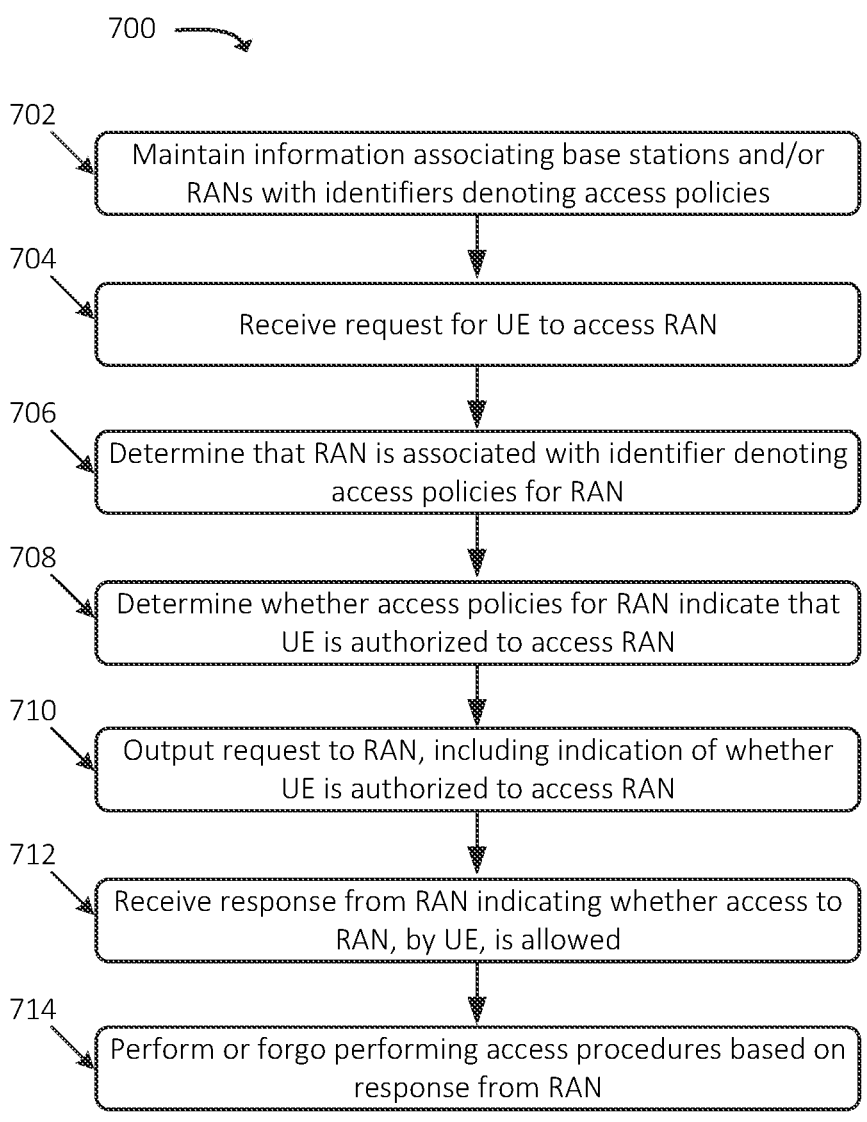

700

702
Maintain information associating base stations and/or RANs with identifiers denoting access policies 704
Receive request for UE to access RAN 706
Determine that RAN is associated with identifier denoting access policies for RAN 708
Determine whether access policies for RAN indicate that UE is authorized to access RAN 710
Output request to RAN, including indication of whether UE is authorized to access RAN 712
Receive response from RAN indicating whether access to RAN, by UE, is allowed 714
Perform or forgo performing access procedures based on response from RAN

802
Maintain access policies, including one or more conditions/criteria

804
Receive request for UE access to RAN, including indication of whether UE is authorized for access to RAN 806
UE authorized?

Yes

No

810
Conditions/criteria met?

Yes

No

812
Reject request for UE access

808
Accept request for UE access

SYSTEMS AND METHODS FOR INTER-RADIO ACCESS TECHNOLOGY HANDOVER

BACKGROUND

Wireless networks provide wireless connectivity to User Equipment ("UEs"), such as mobile telephones, tablets, Internet of Things ("IoT") devices, Machine-to-Machine ("M2M") devices, or the like. Different wireless networks may utilize different radio access technologies ("RATs"), such as a Fifth Generation ("5G") RAT, a Long-Term Evolution ("LTE") RAT, etc. UEs may communicate with different networks that implement different RATs. In the course of such communications, UEs may request a handover over from a first network, that implements a first RAT, to a second network that implements a second RAT. In some scenarios, some networks may be private networks that restrict usage to certain UEs.

BRIEF DESCRIPTION OF THE DRAWINGS

FIGS. 7 and 8 illustrate example processes for access to a RAN with access parameters, such as during an inter-RAT handover, in accordance with some embodiments;

DETAILED DESCRIPTION OF EXAMPLE EMBODIMENTS

The following detailed description refers to the accompanying drawings. The same reference numbers in different drawings may identify the same or similar elements.

Embodiments described herein provide for inter-RAT handovers of UEs to networks that implement access policies. Such policies may restrict access only to certain UEs, and/or may include other types of conditions or criteria, such as allowing UE access based on temporal conditions (e.g., time of day, day of week, etc.), network load metrics (e.g., allow access when network load is below a threshold, deny access when network load is above the threshold, etc.), or other types of conditions or criteria. Different networks may implement protocols, messaging interfaces, etc., which may not necessarily provide for such access policies. As discussed below, some embodiments may provide for the selective access, to a network that implements such access policies, to UEs requesting handovers from other networks (e.g., other networks that do not implement or otherwise provide for such access policies).

Figure 1:
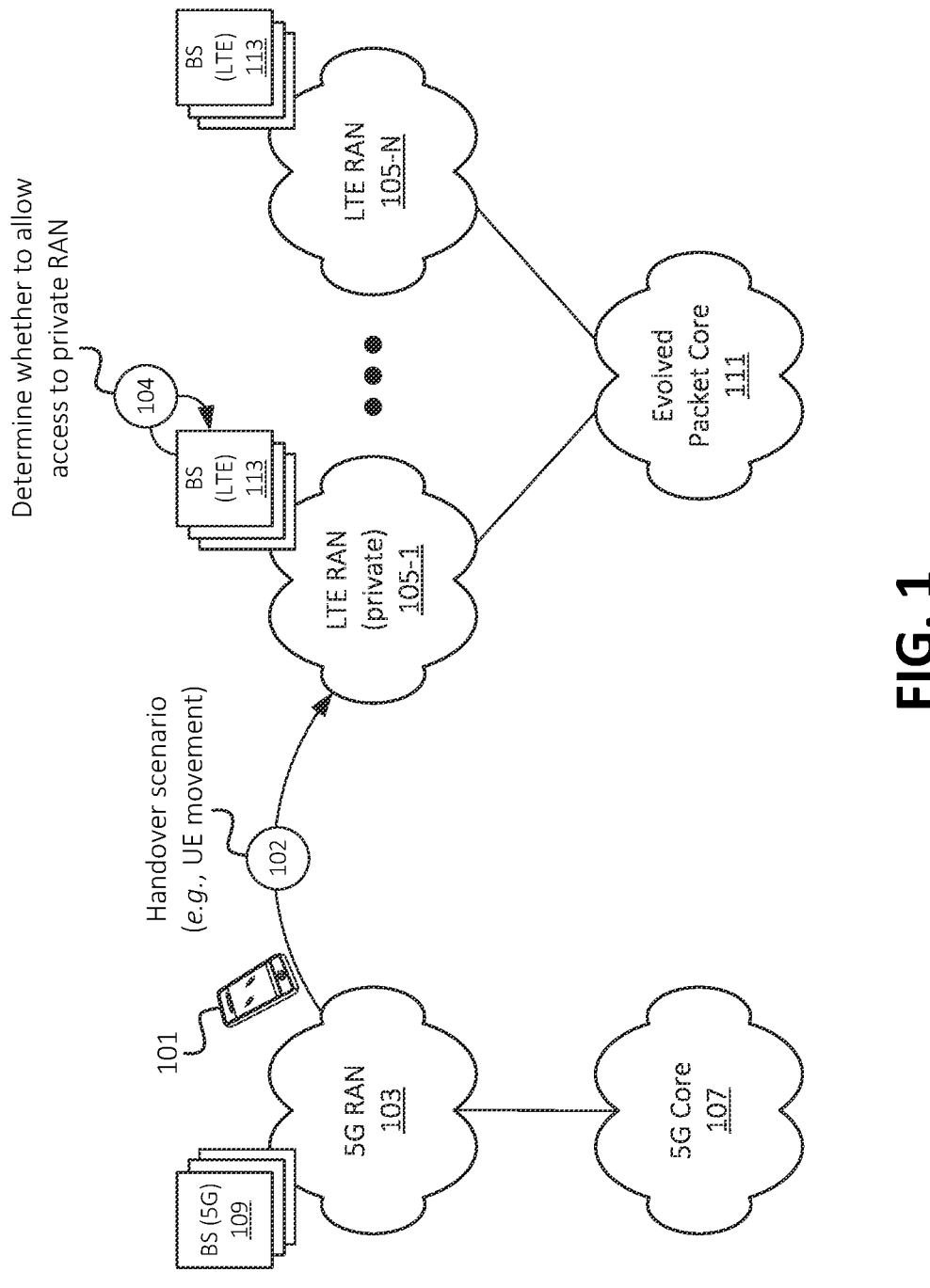
FIG. 1 illustrates an example overview of one or more embodiments described herein.

In some embodiments, such scenarios may occur when a UE is requesting a handover from a 5G RAN to an LTE RAN. For example, as shown in FIG. 1, a handover scenario may be identified (at 102), in which UE 101 should be handed over from 5G RAN 103 to LTE RAN 105-1. For example, UE 101 may request a handover to LTE RAN 105-1, one or more elements of 5G RAN 103 and/or LTE RAN 105-1 may determine that UE 101 should be handed over, etc.

In some embodiments, 5G RAN 103 may be deployed in standalone ("SA") configuration, in which 5G RAN 103 provides a wireless interface between UEs and 5G core ("5GC") 107. For example, 5G RAN 103 may include one or more base stations 109 that operate according to a 5G RAT. Base stations 109 may be, may include, may implement, and/or may otherwise be associated with Next Generation Node Bs ("gNBs") and/or other suitable wireless network infrastructure equipment that operates according to a 5G RAT.

LTE RAN 105-1 may be communicatively coupled to a separate core (e.g., separate from 5GC 107 to which 5G RAN 103 is communicatively coupled), such as Evolved Packet Core ("EPC") 111. LTE RAN 105-1 may be a "private" RAN, inasmuch as access to LTE RAN 105-1 may be restricted to certain UEs and/or may be restricted based on other criteria or access policies, as noted above. In some embodiments, LTE RAN 105-1 may implement a Closed Subscriber Group ("CSG")) technique, in which certain UEs may be associated with a particular identifier (e.g., a CSG identifier) with which LTE RAN 105-1 is also associated.

As shown, multiple LTE RANs 105 may be communicatively coupled to EPC 111. The different LTE RANs 105 may be associated with different sets of access policies, such as different CSG identifiers or other types of identifiers or policies. For example, LTE RAN 105-1 may be "private" (e.g., associated with a particular set of access policies, a particular CSG identifier, etc.), while LTE RAN 105-N may be "public" (e.g., not associated with the same set of access policies as LTE RAN 105-1, not associated with any CSG identifier, etc.).

In some embodiments, LTE RANs 105 may each include one or more base stations 113, which may implement an LTE RAT. In some embodiments, base stations 113 may be, may include, may implement, and/or may otherwise be associated with evolved Node Bs ("eNBs"), femtocells, small cells, Home eNBs ("HeNBs"), LTE network extenders, or the like. Base stations 113 of LTE RANs 105 may additionally maintain information indicating particular CSG identifiers or other suitable identifiers associated with other base stations 113 of LTE RANs 105. For example, base stations 113 of LTE RAN 105-N may maintain CSG identifiers or other suitable identifiers of base stations 113 of LTE RAN 105-1. Further, base stations 113 of LTE RANs 105 may maintain access policies associated with other base stations 113 of LTE RANs 105. For example, base stations 113 of LTE RAN 105-N may maintain access policies associated with base stations 113 of LTE RAN 105-1. The access policies may include a "closed" mode, in which only certain UEs (e.g., UEs identified in an access list) are authorized to access LTE RAN 105-1. As another example, the access policies may include a "hybrid" mode, in which one or more factors (e.g., network load, temporal factors, etc.) in addition to or in lieu of whether a given UE is a member of an access list may be used to determine whether such UE should be given access to respective base stations 113.

In one example, LTE RAN 105-1 may be implemented by a set of HeNBs that are deployed in a home, an office building, etc. LTE RAN 105-1 (e.g., base stations 113 of LTE RAN 105-1, such as the HeNBs) may be associated with a CSG identifier or other suitable type of identifier. Additionally, as discussed above, base stations 113 may be associated with access policies, such as a closed mode, a hybrid mode, etc. Base stations 113 of LTE RAN 105-N (e.g., eNBs of a "public" LTE RAN) may maintain information indicating the CSG identifier and the access policies associated with base stations 113 of LTE RAN 105-1.

Additionally, EPC 111 may maintain information associating particular UEs with the CSG identifier or other identifier of RAN 105-1. In some embodiments, EPC 111 may not maintain information indicating the access policies for each base station 113 of LTE RAN 105-1 (e.g., EPC may not maintain information indicating whether a given base station 113 of LTE RAN 105-1 implements a closed mode, a hybrid mode, etc.). In this manner, in situations where a given UE is handed over from one LTE RAN 105 to another (e.g., from a public RAN such as LTE RAN 105-N to a private RAN such as LTE RAN 105-1), the source RAN (e.g., LTE RAN 105-N) may provide access policy information, associated with the target RAN (e.g., LTE RAN 105-1), to EPC 111. Based on the provided access policy information as well as the information associating particular UEs with the CSG identifier of LTE RAN 105-1 (e.g., the CSG identifier of a target base station 113 of LTE RAN 105-1), EPC 111 may facilitate handover access determinations, such as allowing or denying a UE from being handed over from LTE RAN 105-N to private LTE RAN 105-1.

For example, assume that EPC 111 receives a handover request for a particular UE to be handed over from LTE RAN 105-N to LTE RAN 105-1. As part of the handover request, EPC 111 may receive (e.g., from the source LTE RAN 105-N) an indication that the target LTE RAN 105-1 is associated with a particular CSG identifier and further that LTE RAN 105-1 implements a hybrid mode. Further assume that EPC 111 determines that the given UE is not associated with the same CSG identifier of LTE RAN 105-1 (e.g., is not a member of an access list associated with LTE RAN 105-1). Since EPC 111 has received the indication (e.g., from the source LTE RAN 105-N) that the target LTE RAN 105-1 is in a hybrid mode, EPC 111 may be able to further evaluate factors associated with the hybrid mode (e.g., network load, temporal conditions, etc.) to determine whether to allow or deny the handover request from LTE RAN 105-N to LTE RAN 105-1.

On the other hand, in situations where UE 101 is to be handed over (at 102) from 5G RAN 103 to LTE RAN 105-1, the handover request from 5G RAN 103 may not include all of the same information as discussed above with respect to the example handover from LTE RAN 105-N to LTE RAN 105-1. For example, base stations 109 of 5G RAN 103 may not be configured to include CSG identifiers, base station access policies (e.g., closed mode, hybrid mode, etc.) of LTE RANs 105. As such, EPC 111 may not be able to determine whether to allow or deny handover requests in certain situations, such as in situations where LTE RAN 105-1 is in a hybrid mode and where UE 101 is not associated with the same CSG identifier as LTE RAN 105-1.

Embodiments described below provide for such handovers to be performed, without requiring EPC 111 to be modified to maintain base station access policies associated with base stations 113. For example, as discussed below, the target LTE RAN 105-1 (e.g., a particular target base station 113 of LTE RAN 105-1) may ultimately determine (at 104) whether to allow a handover, of UE 101 from 5G RAN 103 to LTE RAN 105-1, to proceed.

Although examples discussed herein are provided in the context of a handover of UE 101 from 5G RAN 103 to a particular LTE RAN 105, similar concepts may apply in embodiments in which other types of RANs are used (e.g., utilizing RATs that are different from 5G and/or LTE RATs). For example, similar concepts may apply in embodiments where a source RAN does not include or does not have access to base station access policies (e.g., closed mode, hybrid mode, etc.) associated with a target RAN (or base station access policies of base stations of the target RAN). For the sake of brevity, and further in view of the remarks above clarifying that the concepts described below use 5G and LTE as examples, 5G RAN 103 and LTE RAN 105 are sometimes referred to below as "RAN 103" (or "source RAN 103") and "RAN 105" (or "target RAN 105"), respectively. Similarly, 5GC 107 and EPC 111 are sometimes referred to below as "core network 107" and "core network 111."

Figure 2:
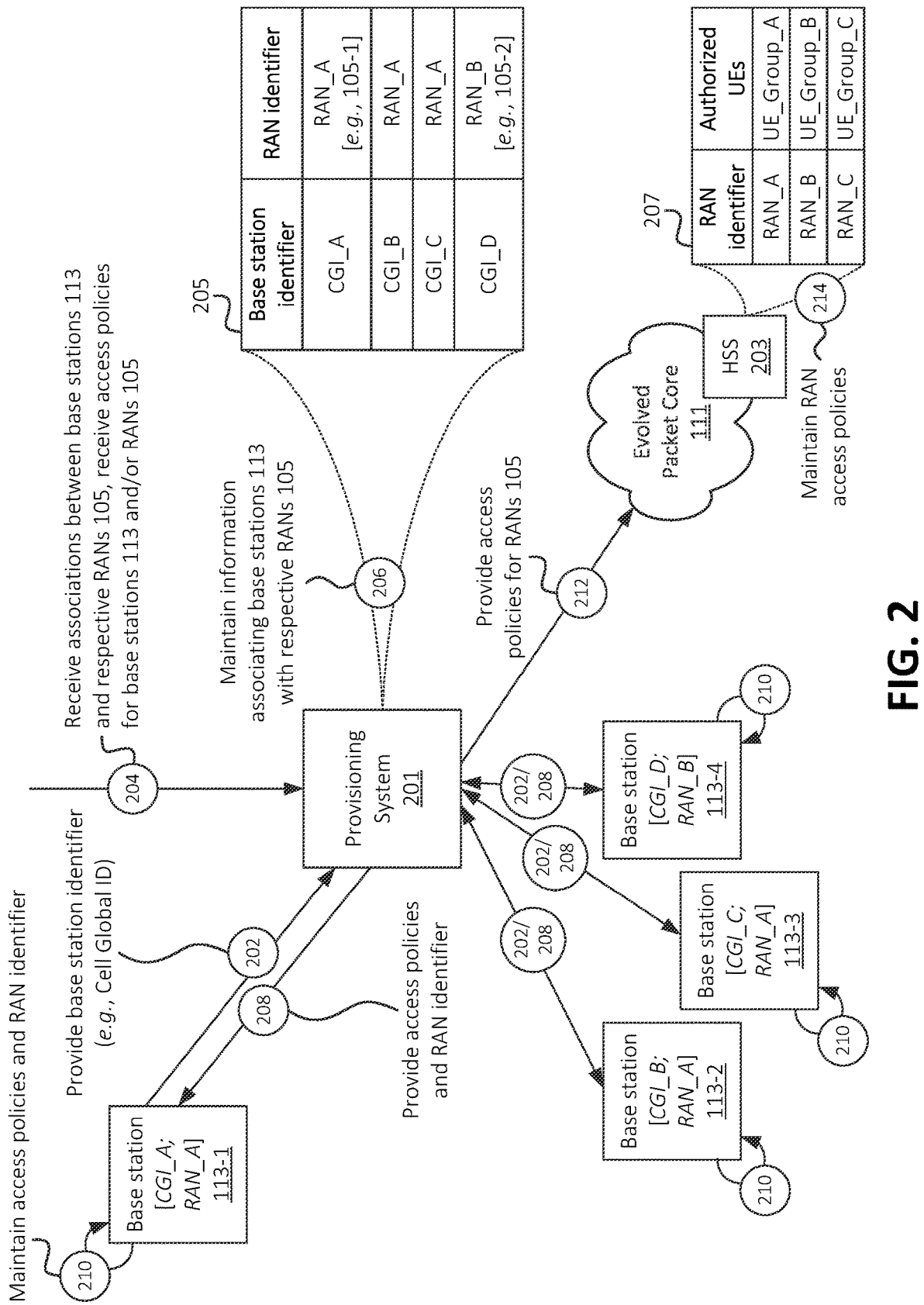
FIGS. 2 and 3 illustrate example configuration operations, in accordance with some embodiments.
Figure 3:
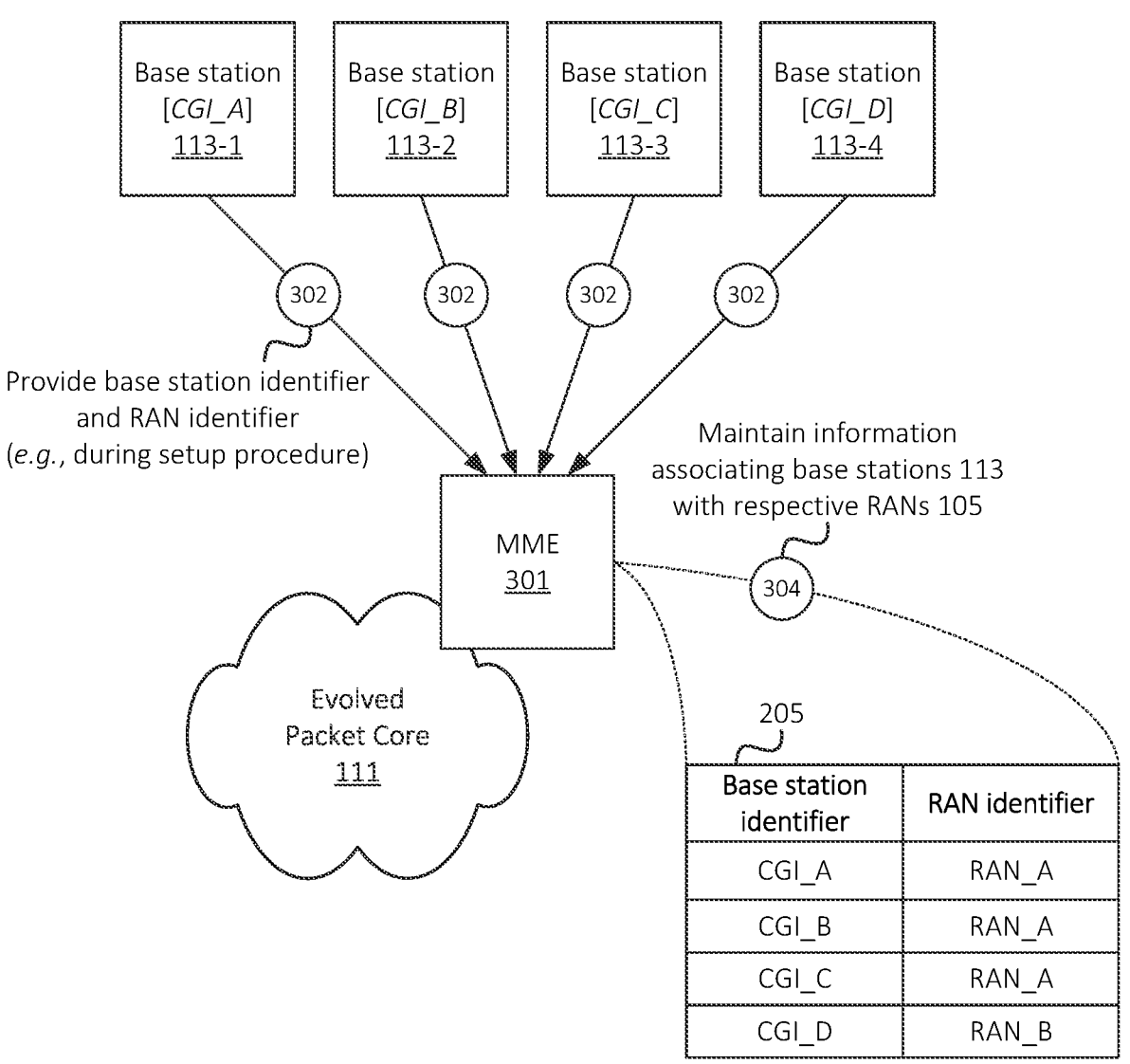

FIGS. 2 and 3 illustrate example operations that may be used to register base stations 113 of one or more RANs 105 with core network 111. As shown in FIG. 2, provisioning system 201 may communicate with one or more elements of core network 111 (e.g., Home Subscriber Server ("HSS") 203 or some other suitable element of core network 111). Provisioning system 201 may, for example, be associated with or accessible to respective owners or operators of one or more RANs 105 and/or of core network 111. In some embodiments, provisioning system 201 may include or implement a web portal, application programming interface ("API"), or other suitable communication pathway via which owners or operators of respective RANs 105 (and/or of core network 111) may associate particular base stations 113 with particular RANs 105, with particular CSG identifiers, and/or with other suitable information.

As shown, provisioning system 201 may receive (at 202) an identifier of one or more base stations 113 (e.g., identifiers of example base stations 113-1, 113-2, 113-3, and 113-4). The identifier of each base station may be, may include, etc. a Cell Global Identifier ("CGI"), a hardware identifier, a serial number, or other suitable type of identifier that uniquely distinguishes each base station 113. In this example, base stations 113-1, 113-2, 113-3, and 113-4 are associated with example identifiers CGI_A, CGI_B, CGI_C, and CGI_D, respectively.

Provisioning system 201 may receive (at 202) the base station identifiers from base stations 113 (e.g., during a setup or registration procedure), and/or from some other suitable source. Provisioning system 201 may also receive (at 204) information associating particular base stations 113 with particular RANs 105. For example, owners and/or operators of respective RANs 105 may communicate with provisioning system 201 via a web portal, API, etc. to associate respective base stations 113 with particular RANs 105, CSG identifiers, etc. In some embodiments, provisioning system 201 may maintain (at 206) such information, as reflected in example data structure 205. As shown, for example, provisioning system 201 may receive (at 204) information associating base stations 113-1, 113-2, and 113-3 (e.g., having example identifiers CGI_A, CGI_B, and CGI_C) with a first RAN 105-1 (e.g., having the example identifier RAN_A), and may further receive information associating base station 113-4 (e.g., having example identifier CGI_D) with a second RAN 105-2 (e.g., having the example identifier RAN_B).

In some embodiments, the "RAN identifiers" referred to herein may be, may include, or may otherwise refer to CSG identifiers or other types of identifiers that denote particular access lists and/or other access policies (e.g., load-based access policies, temporal access policies, etc.). In practice, one RAN 105 may be associated with multiple RAN identifiers (e.g., multiple CSG identifiers), one base station 113 may be associated with multiple RAN identifiers, etc. For example, in some embodiments, one base station 113 of a given RAN 105 may be associated with a first RAN identifier (e.g., a first CSG identifier), a second base station 113 of the same RAN 105 may be associated with a second RAN identifier (e.g., a second CSG identifier), a third base station 113 of the same RAN 105 may be associated with the first and second RAN identifiers, and so on. For the sake of simplicity, each RAN 105 and base station 113 is described herein as being associated with one RAN identifier (e.g., one CSG identifier).

Provisioning system 201 may also receive (at 204) access policies for base stations 113 and/or RANs 105. As discussed above, such access policies may include indications of whether respective base stations 113 and/or RANs 105 are associated with a closed mode, a hybrid mode, etc. The access polices for RANs 105 may include access lists or other suitable indicators of UEs that are authorized to access particular RANs 105. For example, the RAN access policies may include an indication that a first group of UEs (e.g., UE_Group_A) is authorized to access RAN_A (e.g., an association between UE_Group_A and RAN_A), an indication that a second group of UEs (e.g., UE_Group_B) is authorized to access RAN_B, and an indication that a third group of UEs (e.g., UE_Group_C) is authorized to access RAN_C. As noted above, such association information may include indications that respective groups of UEs are on an access list that is associated with respective RAN identifiers (e.g., CSG identifiers). Although discussed herein as "UE_Group_A," "UE_Group_B," etc., the access lists or indications of authorized UEs may be denoted in some other suitable manner, such as values or ranges of values for UE identifiers (e.g., International Mobile Station Equipment Identity ("IMEI") values, Subscription Permanent Identifier ("SUPI") values, Globally Unique Temporary Identifier ("GUTI") values, International Mobile Subscriber Identity ("IMSI") values, etc.), types or categories of UEs (e.g., "first responder," "enterprise," "IoT device," etc.), or the like.

Further, for base stations 113 and/or RANs 105 that associated with the hybrid mode (or are otherwise associated with conditions or criteria other than UE membership in a given group or presence on an access list), provisioning system 201 may receive (at 204) information regarding conditions, criteria, etc. based on which access can be determined for UEs that are not in an access list (or are otherwise authorized) for a given RAN 105. As discussed above, such conditions, criteria, etc. may include thresholds, values, ranges of values, etc. for factors such as network load, temporal conditions, etc.

Provisioning system 201 may provide (at 208) the access policies and the RAN identifier to each respective base station 113. For example, as shown, provisioning system 201 may provide the example RAN identifier "RAN_A" to base stations 113-1, 113-2, and 11-3, and may provide the example RAN identifier "RAN_B" to base station 113-4. For example, provisioning system 201 may determine, based on the information shown in data structure 205, that base station 113-1 is associated with RAN_A, that base station 113-2 is also associated with RAN_A, and so on. Further, provisioning system 201 may identify the respective access policies (e.g., closed mode, hybrid mode, other conditions or criteria, etc.) for each base station 113 based on the information received (at 204) from an owner, operator, administrator, etc. of respective base stations 113 and/or RANs

105. Each base station 113 may maintain (at 210) the received access policies and RAN identifier.

In some embodiments, provisioning system 201 may provide (at 208) the access policies and RAN identifiers for multiple base stations 113. For example, provisioning system 201 may additionally provide (at 208) the access policies and RAN identifiers, associated with base stations 113-2, 113-3, and/or 113-4 to base station 113-1. In this manner, each base station 113 may maintain (at 210) information regarding the RAN identifiers and/or access policies of one or more other base stations 113.

Provisioning system 201 may further provide (at 212) the access policies for RANs 105 to one or more information repositories or other suitable elements of core network 111, such as HSS 203. Provisioning system 201 may communicate with core network 111 and/or HSS 203 via a Service Capability Exposure Function ("SCEF"), an API, or some other suitable communication pathway. As discussed above, core network 111 may determine that provisioning system 201 is authorized to provide the access policies, and/or may authenticate provisioning system 201 prior to implementing or maintaining the access policies provided by provisioning system 201. Core network 111 (e.g., HSS 203) may maintain (at 214) the received access policies, as shown in example data structure 207.

As similarly discussed above, core network 111 (e.g., HSS 203) may maintain (e.g., in data structure 207 or in some other suitable manner) the associations between RAN identifiers (e.g., CSG identifiers) and authorized UEs (e.g., access lists for each RAN identifier), without maintaining additional conditions or criteria for access to particular base stations 113. For example, core network 111 may not maintain an indication of whether a given base station 113 or RAN 105 is associated with a closed mode or a hybrid mode, and/or may not maintain additional conditions or criteria (e.g., load-based criteria, temporal criteria, etc. which may be associated with the hybrid mode).

As shown in FIG. 3, base stations 113 may each provide (at 302) a respective base station identifier and a RAN identifier to a mobility and/or access management element of core network 111, such as Mobility Management Entity ("MME") 301. For example, base stations 113 may provide such information to MME 301 during an S1 Setup procedure or other suitable procedure. In some embodiments, MME 301 may receive such information from some other source. Based on receiving the base station identifiers and associated RAN identifiers, MME 301 may maintain (at 304) information (e.g., as represented by data structure 205) associating particular base stations 113 with particular RANs 105. For example, as discussed above, data structure 205 may include information associating base stations 113-1, 113-2, and 113-3 (e.g., having example base station identifiers CGI_A, CGI_B, and CGI_C) with RAN 105-1 (e.g., having example RAN identifier RAN_A), and may further include information associating base station 113-4 (e.g., CGI_D) with RAN 105-2 (e.g., RAN_B).

Based on the registration and/or setup procedures shown in FIGS. 2 and 3, base stations 113 and core network 111 may be in possession of information that may be used to effect a handover of UE 101 from a first RAN (e.g., RAN 103) that is associated with a first core network (e.g., core network 107) to a second RAN (e.g., RAN 105) that is associated with a second core network (e.g., core network 111). As noted above, core network 107 may not be in possession of or have access to certain information regarding access parameters to RAN 105, even though core network 111 may be in possession of or have access to such information.

Figure 4:
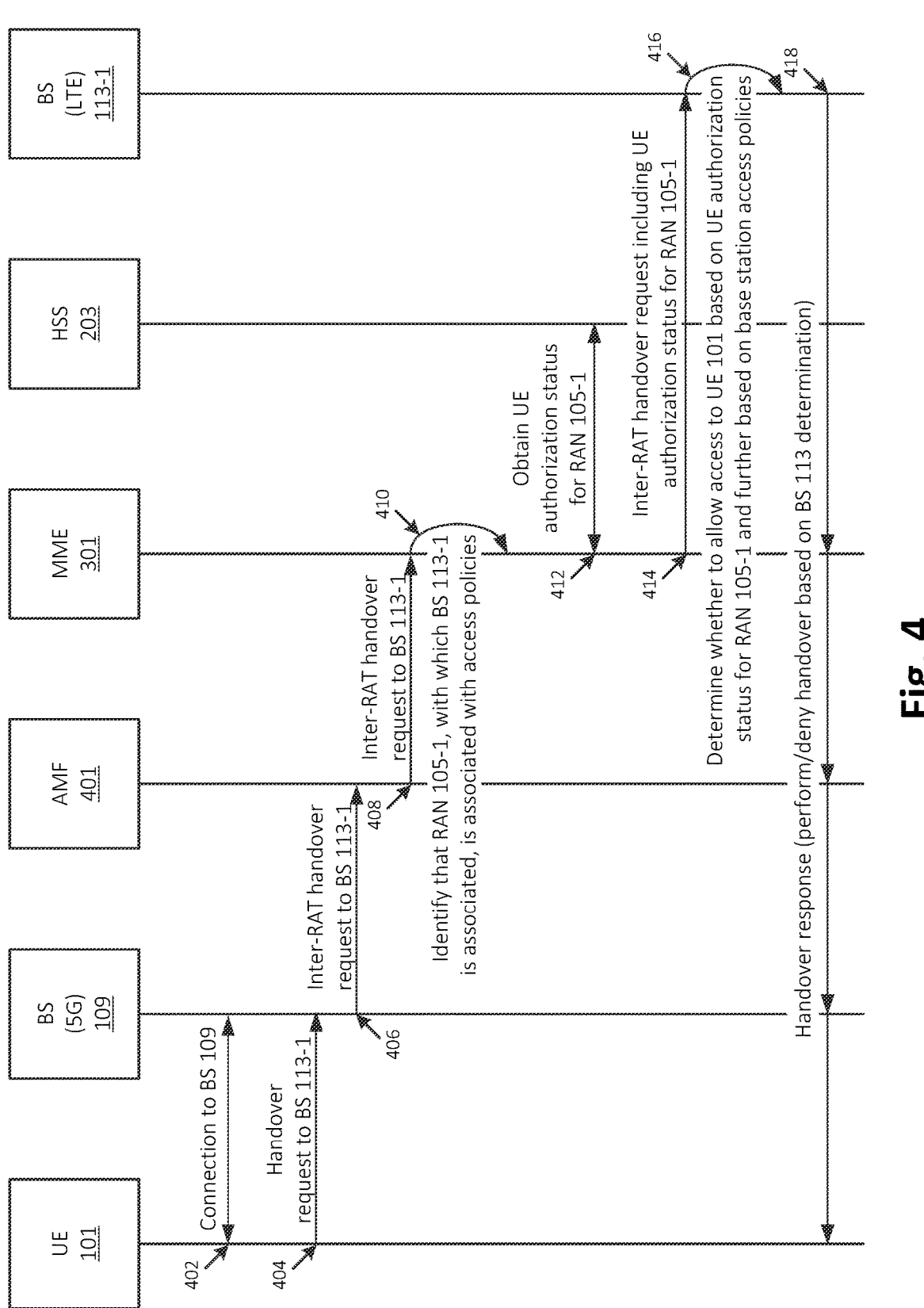
FIG. 4 illustrates an example of an inter-RAT handover to a RAN with access parameters, in accordance with some embodiments.

As shown in FIG. 4, for example, assume that UE 101 is connected (at 402) to base station 109, which may be a gNB of a 5G RAN 103, as discussed above. As discussed above, RAN 103 may be communicatively coupled to a particular core network 107, such as a 5GC. As also discussed above, base station 109 and core network 107 may not maintain or have access to access parameters associated with another RAN, such as one or more RANs 105.

At some point, base station 109 may receive (at 404) a request to hand over UE 101 to base station 113-1 (e.g., which is communicatively coupled to a different core network 111 than core network 107 to which base station 109 is communicatively coupled). Additionally, or alternatively, base station 109 may otherwise determine that UE 101 should be handed over to base station 113-1. For example, UE 101 may provide measurement reports or other suitable information, based on which base station 109 may indicate that a signal strength or quality between UE 101 and base station 113-1 is greater than a signal strength or quality between UE 101 and base station 109. In some embodiments, one or more other factors may be used to determine that UE 101 should be handed over to base station 113-1.

The measurement report may include, or base station 109 may otherwise determine, an identifier of base station 113-1 (e.g., a cell identifier, such as a CGI). In some embodiments, base station 109 may include other suitable information regarding base station 113-1 and/or RAN 105-1, such as a Public Land Mobile Network ("PLMN") identifier or other suitable information. The handover request (at 404) may include an identifier of UE 101, such as an IMEI value, an IMSI value, a SUPI value, a GUTI value, etc.

In some embodiments, base station 109 receive information indicating, or may otherwise determine, that the requested handover is an inter-RAT handover (e.g., is associated with a different RAT than is implemented by base station 109, and/or that a target RAN of the handover is associated with a different core network than core network 107 to which base station 109 is communicatively coupled).

Based on receiving the request (or otherwise determining that UE 101 should be handed over to base station 113-1), base station 109 may output (at 406) an inter-RAT handover request to a mobility and/or access management function of core network 107, such as Access and Mobility Management Function ("AMF") 401. The inter-RAT handover request may be, may include, etc. an Next-Generation Application Protocol ("NGAP") message, such as an NGAP Handover Required message. The NGAP Handover Required message may include an information element, a field, a flag, etc. indicating that the requested handover is an inter-RAT handover. For example, the NGAP Handover Required message may include a Handover Type information element with a value of "5GStoEPS" to indicate that the requested handover is from a 5G system ("5GS"), which includes 5G RAN 103 and 5GC 107, to an Evolved Packet System ("EPS"), which includes LTE RAN 105-1 and EPC 111. In some embodiments, the inter-RAT handover request (at 406) may include an identifier of base station 113-1 (e.g., a CGI of base station 113-1) or of RAN 105-1 with which base station 113-1 is associated. Further, the handover request (at 406) may include an identifier of UE 101, such as an IMEI value, an IMSI value, a SUPI value, a GUTI value, etc.

AMF 401 may forward (at 408) the inter-RAT handover request to EPC 111 (e.g., to MME 301 of EPC 111). For example, AMF 401 may select, based on the identifier of base station 113-1 or of RAN 105-1, and/or based on other suitable information, MME 301 from a group of MMEs. For example, multiple different MMEs, with which AMF 401 is able to communicate (e.g., via one or more N26 interfaces), may be associated with different RANs 105 and/or core networks. In some embodiments, the request (at 408) may include an N26 Forward Relocation Request. The request (at 408) may include an identifier of base station 113-1 (e.g., a CGI of base station 113-1) or of RAN 105-1 with which base station 113-1 is associated, as well as an identifier of UE 101, such as an IMEI value, an IMSI value, a SUPI value, a GUTI value, etc.

MME 301 may determine (at 410) that RAN 105-1, with which base station 113-1 is associated, is associated with one or more access policies, such as an access list of authorized UEs. For example, MME may compare an identifier of base station 113-1 (e.g., a CGI of base station 113-1, such as example CGI_A) to data structure 205. Based on such comparison, MME 301 may identify that base station 113-1 is associated with a particular RAN identifier, such as a CSG identifier (e.g., RAN_A in this example). Such RAN identifier may denote that base station 113-1 is associated with one or more access policies, such as an authorized group of UEs and/or other additional conditions or criteria, as discussed above.

MME 301 may obtain (at 412) UE authorization status for RAN 105-1, with which base station 113-1 is associated. For example, MME 301 may determine, based on data structure 205 or other suitable information maintained by MME 301, that base station 113-1 is associated with a particular RAN identifier (e.g., RAN_A) for which one or more access lists or access parameters exist. Based on determining that base station 113-1 is associated with an access list of access parameters (e.g., based on identifying that base station 113-1 is associated with a particular RAN identifier such as example RAN_A), MME 301 may query HSS 203 for an indication of whether UE 101 is an authorized UE with respect to RAN 105-1. For example, MME 301 may request an indication of whether UE 101 is in a group or access list of authorized UEs with respect to the particular RAN identifier (e.g., RAN_A, in this example) with which base station 113-1 is associated. HSS may perform a lookup or other suitable operation (e.g., based on data structure 207) to determine whether UE 101 is an authorized UE with respect to base station 113-1 and/or RAN 105-1, and may provide (at 412) an indication of whether UE 101 is such an authorized UE.

In accordance with some embodiments, MME 301 may forgo making a determination of whether to allow or deny the handover request from base station 109 to base station 113-1 when receiving (at 412) the UE authorization status. For example, as noted above, even if UE 101 is not an authorized UE with respect to base station 113-1, base station 113-1 may potentially be associated with a hybrid mode or may have other conditions or criteria based on which UEs that are not specifically authorized may still be allowed to access base station 113-1.

MME 301 may output (at 414) an inter-RAT handover request to base station 113-1. For example, the handover request may be or may include an S1AP Handover Request message (e.g., via an S1 interface between MME 301 and base station 113-1). The handover request may indicate that the requested handover is an inter-RAT handover. For example, the S1AP Handover Request message may include a Handover Type information element with a "5GStoEPS" value. Further, the handover request may include the RAN identifier (e.g., a CSG identifier) as well as an indication of whether UE 101 is an authorized UE with respect to the particular RAN identifier (e.g., whether an access list for RAN 105-1 includes an identifier of UE 101).

Base station 113-1 may determine (at 416) whether to allow access to UE 101 based on the authorization status of UE 101 for RAN 105-1 and/or further based on one or more policies, conditions, criteria, etc. Base station 113-1 may respond (at 418) to MME 301 with an indication of whether to allow or deny the handover request. For example, base station 113-1 may output an S1AP Handover Request Ack message (or other suitable message) when determining that the handover should be allowed, and may output an S1AP Handover Failure message (or other suitable message) when determining that the handover should be rejected or otherwise not allowed. As further shown, MME 301, AMF 401, base station 109, and UE 101 may perform other communications in order to cause the handover to be completed in situations where the handover is indicated as allowed, or in order to cause the handover to be rejected in situations where the handover is indicated as not allowed.

Figure 5A:
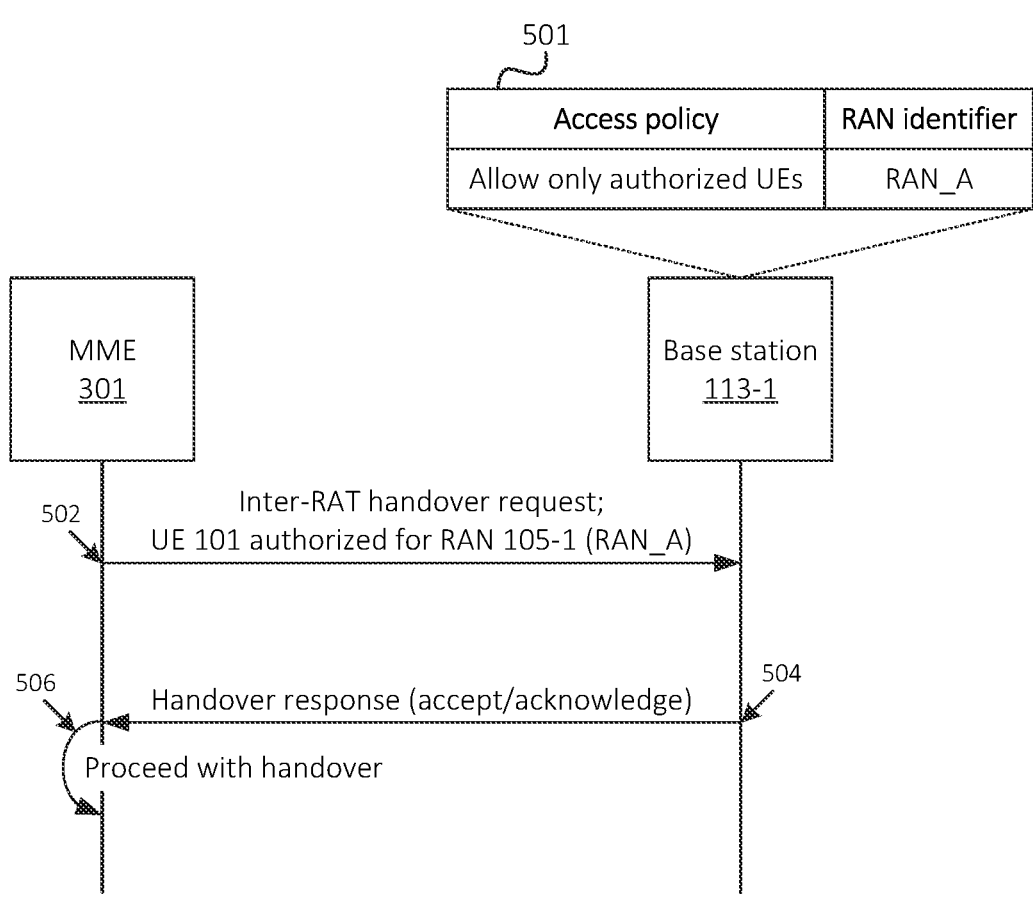
FIGS. 5A, 5B, and 6A-6C illustrate example scenarios of an inter-RAT handover to a RAN with access parameters, in accordance with some embodiments.
Figure 5B:
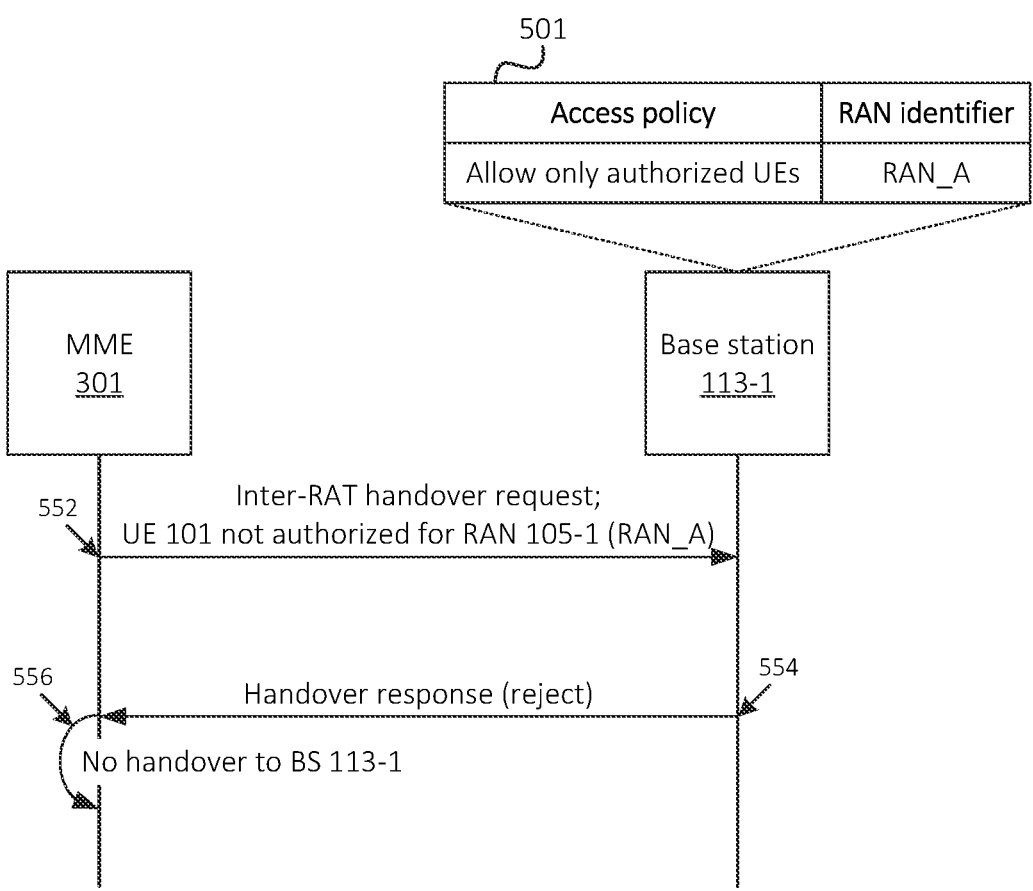
Figure 6A:
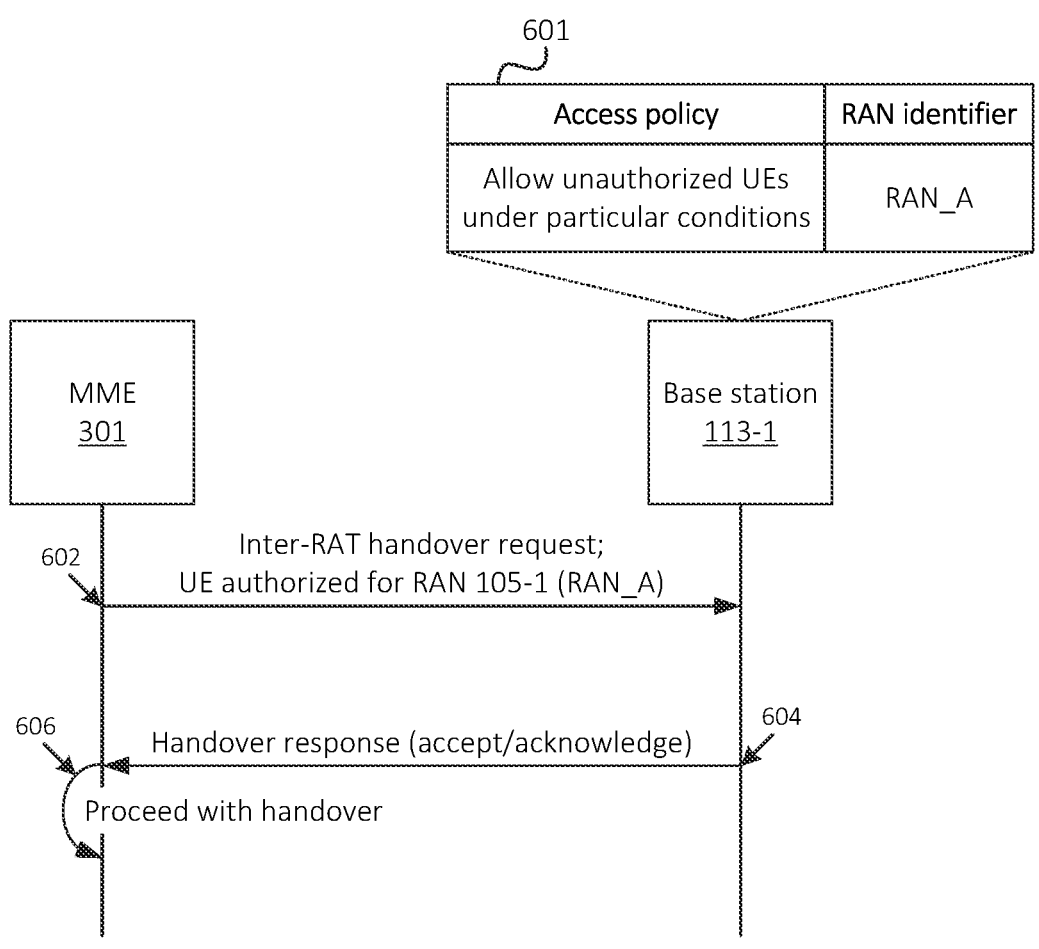
Figure 6B:
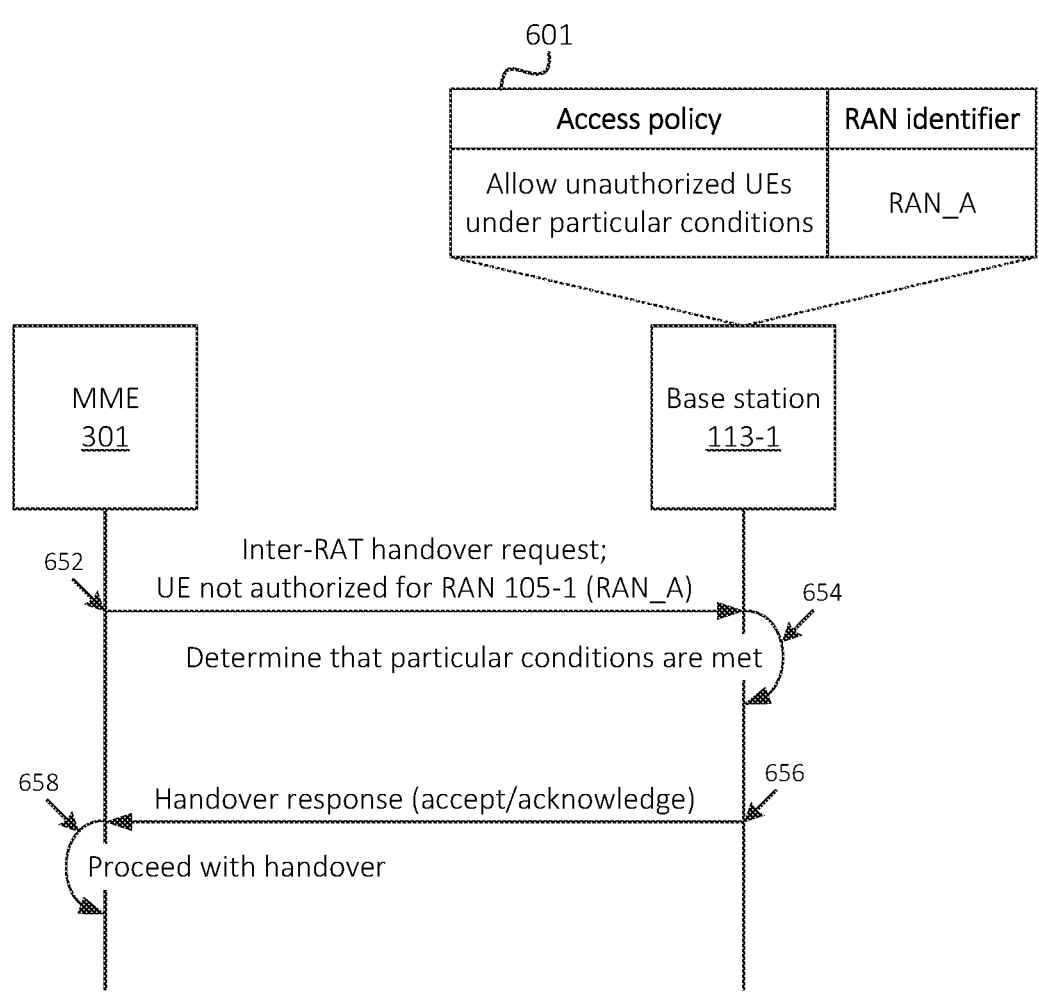
Figure 6C:
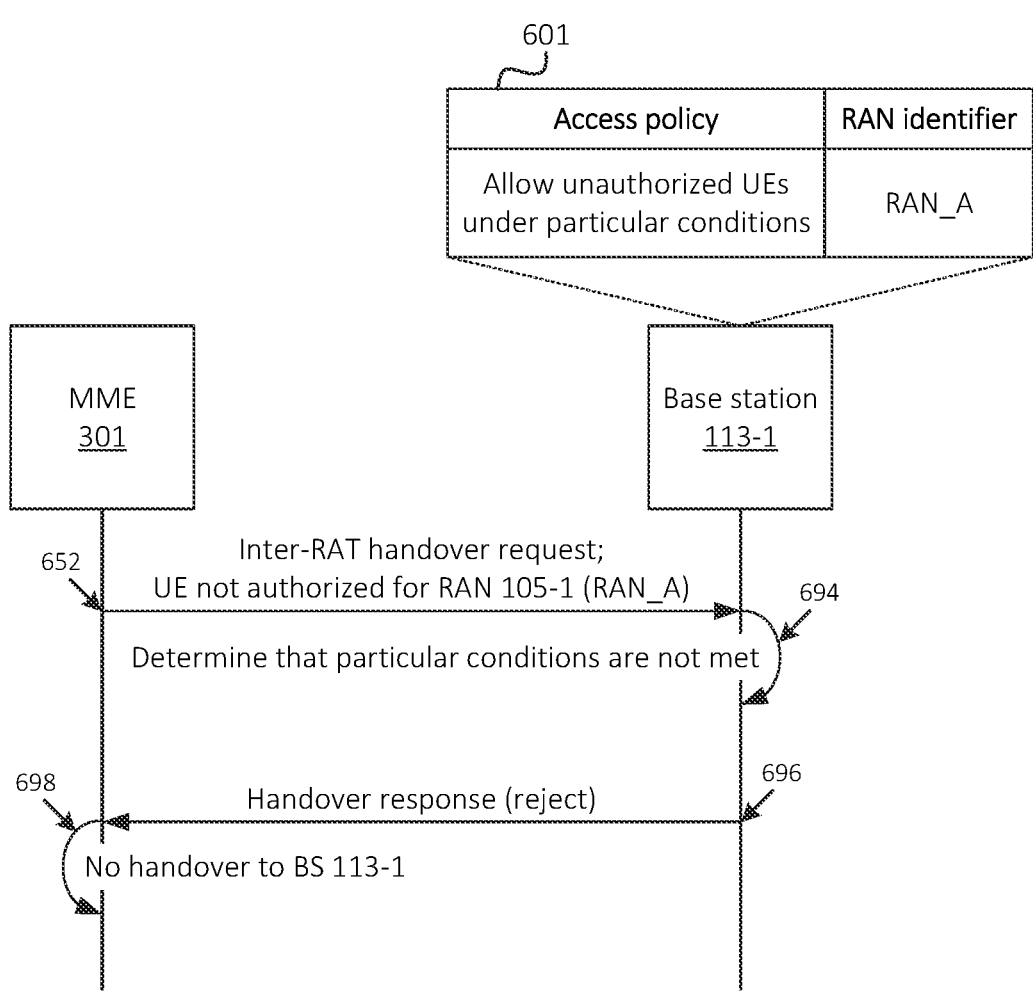

FIGS. 5A, 5B, and 6A-6C provide further examples of scenarios in which base station 113-1 determines (at 416) whether an handover of UE 101 from base station 109 to base station 113-1 should be allowed or not allowed. In FIGS. 5A and 5B, base station 113-1 may maintain data structure 501, indicating that a RAN identifier of base station 113-1 is RAN_A and that such RAN identifier is associated with an access policy whereby only authorized UEs are allowed to access base station 113-1 (e.g., a closed mode). In FIGS. 6A-6C, base station 113-1 may maintain data structure 601, indicating that the RAN identifier of base station 113-1 is associated with an access policy whereby UEs that are not specifically authorized to access base station 113-1 and/or RAN 105-1 may still access base station 113-1 under certain conditions (e.g., a hybrid mode).

As shown in FIG. 5A, base station 113-1 may receive (at 502) an inter-RAT handover request from MME 301, specifying a requested handover of UE 101 to base station 113-1. The request may further specify that UE 101 is authorized for access to RAN 105-1 with which base station 113-1 is associated. For example, as discussed above, MME 301 may have received an indication from HSS that an access list associated with RAN 105-1 includes identifier of UE 101. Since UE 101 is an authorized UE for RAN 105-1, base station 113-1 may respond (at 504) with an indication that the handover should be allowed to proceed, and MME 301 may proceed (at 506) with causing the handover to take effect. As discussed above, for example, MME 301 may output one or more messages to AMF 401 (e.g., an N26 Forward Relocation Response including identifiers of base station 113-1 and UE 101), which may output one or more suitable messages to base station 109 (e.g., an NGAP Handover Command including identifiers of base station 113-1 and UE 101), which may in turn perform one or more other suitable operations to complete the handover of UE 101 to base station 113-1.

On the other hand, in FIG. 5B, base station 113-1 may receive (at 552) an inter-RAT handover request indicating that UE 101 is not authorized for RAN 105-1. As noted above, base station 113-1 may maintain data structure 501, including information indicating that an access policy for base station 113-1 and/or RAN 105-1 is to allow authorized UEs only (e.g., a closed mode). In this example, base station 113-1 may determine that the handover request should be rejected, as UE 101 is not included in an access list (e.g., a list of authorized UEs) for base station 113-1 and/or RAN 105-1. Accordingly, base station 113-1 may output (at 554)

a handover response to MME 301 indicating that the requested handover is rejected. MME 301 may forgo (at 556) effecting a handover to base station 113-1, which may include outputting one or more rejection messages to AMF 401. Handover rejection messages may be accordingly forwarded base station 109, UE 101, etc.

In FIG. 6A, base station 113-1 may receive (at 602) an inter-RAT handover request on behalf of UE 101, indicating that UE 101 is authorized for access to RAN 105-1. Since UE 101 is authorized for access to RAN 105-1 (with which base station 113-1 is associated), base station 113-1 may proceed to output (at 604) an indication that the handover response is allowed, and MME 301 may proceed (at 606) to effectuate the handover.

In FIG. 6B, base station 113-1 may receive (at 652) an inter-RAT handover request indicating that UE 101 is not authorized for RAN 105-1. As noted above, base station 113-1 may, in this example, maintain data structure 601, indicating that unauthorized UEs are allowed access to base station 113-1 under certain conditions (e.g., that base station 113-1 is associated with a hybrid mode). Such conditions may relate to network load (e.g., a quantity of UEs connected to base station 113-1, an amount of available radio resources associated with base station 113-1, and/or other suitable load metrics), temporal conditions (e.g., time of day, day of week, etc.), and/or other suitable conditions. In this example, base station 113-1 may determine (at 654) that the particular conditions are met, and that UE 101 should therefore be allowed access to base station 113-1 despite an access list for base station 113-1 not including UE 101. Accordingly, base station 113-1 may indicate (at 656) to MME 301 that the handover should be allowed to proceed, based on which MME 301 may proceed (at 658) to effectuate the handover of UE 101 to base station 113-1.

FIG. 6C illustrates a scenario in which, when receiving (at 652) an indication that UE 101 is not authorized for access to base station 113-1, and further when base station 113-1 is associated with further conditions or criteria (e.g., is in a hybrid mode), base station 113-1 determines (at 694) that the conditions indicated in the access policy (e.g., as maintained in data structure 601) are not met. For example, base station 113-1 may determine that base station 113-1 is overloaded, that a present time does not meet temporal conditions specified in the access policy, etc. In such a scenario, base station 113-1 may indicate (at 696) that the handover request is rejected, and MME 301 may forgo (at 698) effectuating a handover of UE 101 to base station 113-1.

FIG. 7 illustrates an example process 700 for handling a request for access to a RAN with access parameters, such as RAN 105 (e.g., a private RAN, a RAN that implements a CSG technique, a RAN implemented by one or more HeNBs, etc.). In some embodiments, some or all of process 700 may be performed by a mobility and/or access element of a core network that is communicatively coupled to the RAN, such as MME 301. In some embodiments, one or more other devices may perform some or all of process 700 in concert with, and/or in lieu of, MME 301.

As shown, process 700 may include maintaining (at 702) information associating base stations and/or RANs with identifiers denoting access policies for the RANs. For example, MME 301 may maintain (e.g., as discussed above with respect to data structure 205) information associating particular base stations 113 (e.g., identifiers of base stations 113, such as CGI values or other suitable identifiers) with particular RAN identifiers or other identifiers denoting access policies (e.g., CSG values or other suitable identifiers). In some scenarios, some base stations 113 may not be associated with such a RAN identifier, such as base stations 113 that are "open" or "public." MME 301 may receive the information associating base stations 113 with such RAN identifiers during an S1 Setup procedure associated with each base station 113, and/or through some other suitable mechanism.

Process 700 may further include receiving (at 704) a request for a particular UE 101 to access a particular RAN 105. The request may include, for example, an identifier of the particular UE 101 (e.g., an IMSI value, an IMEI value, a SUPI value, a GUTI value, etc.), an identifier of RAN 105 or a portion thereof (e.g., a CGI or other suitable identifier of a particular base station 113 or cell for which access is being requested), and/or other suitable information. In some embodiments, the request may be or may include a handover request. In some embodiments, the handover request may be an inter-RAT handover request. In some embodiments, the handover request may be received from a different RAN or wireless network than RAN 105. For example, as discussed above, RAN 105 may be associated with a first wireless network (e.g., an EPS that includes LTE RAN 105 and EPC 111), and the handover request may be received from a second wireless network (e.g., a 5GS that includes 5G RAN 103 and 5GC 107). In some embodiments, the handover request may be or may include a Forward Relocation Request received via an N26 interface between the first wireless network and the second wireless network (e.g., between MME 301 of EPC 111 and AMF 401 of 5GC 107).

Process 700 may additionally include determining (at 706) that the particular RAN 105 is associated with a RAN identifier denoting that the RAN is associated with a set of access policies. For example, MME 301 may determine, based on the maintained (at 702) information associating base stations and/or RANs with identifiers denoting access policies, that the particular RAN 105 and/or portion thereof (e.g., a particular base station 113 indicated in the request for access) is associated with a particular CSG identifier or other suitable identifier denoting one or more access policies for such RAN 105.

Although not explicitly shown in the figure, in scenarios where RAN 105 is not associated with such an identifier denoting access policies (e.g., if RAN 105 is not associated with a CSG identifier), then MME 301 may respond to the request by initiating or otherwise proceeding with allowing access to RAN 105. Such scenarios may include MME 301 initiating a handover of UE 101 to RAN 105 or otherwise allowing access of UE 101 to RAN 105.

Assuming that MME 301 has determined (at 706) that RAN 105 is associated with an identifier denoting access policies for RAN 105, process 700 may further include determining (at 708) whether the access policies for RAN 105 indicate that UE 101 is authorized to access the particular RAN 105. For example, MME 301 may output a request to HSS 203 or some other suitable device or system (e.g., an element of core network 111), including an identifier of UE 101 as well as the RAN identifier of RAN 105 (e.g., a CSG identifier of RAN 105). As discussed above, HSS 203 may maintain information associating particular UEs (e.g., UE identifiers) with particular RAN identifiers (e.g., CSG identifiers). Such information may include an access list or other suitable indications of UEs that are authorized to access particular RANs that are associated with such RAN identifiers. HSS 203 may respond with an indication of whether UE 101 is authorized to access RAN 105 or not (e.g., an indication of whether an access list for the provided RAN identifier of RAN 105 includes an identifier of UE 101).

Process 700 may further include outputting (at 710) a request to the particular RAN 105, including an indication of whether UE 101 is authorized to access RAN 105. MME 301 may, for instance, output a request or other message to RAN 105 (e.g., to a particular base station 113 of RAN 105, as indicated in the request for access at 704) that includes an indication that UE 101 is requesting access to RAN 105, and further includes an indication of whether UE 101 is authorized for access to RAN 105 (e.g., as determined (at 706) based on access policies associated with RAN 105). For example, in lieu of making a determination of whether access to RAN 105 should ultimately be allowed, MME 301 may instead pass the decision to RAN 105. The request (at 710) may include a handover request, such as an S1AP handover request. In some embodiments, the handover request may specify that the handover is an inter-RAT handover. As discussed above as well as below with respect to FIG. 8, RAN 105 may determine whether to allow access to UE 101 based on the provided indication, as well as potentially one or more additional conditions, criteria, policies, etc.

Process 700 may additionally include receiving (at 712) a response, from the particular RAN 105, indicating whether access to RAN 105, by UE 101, is allowed. Process 700 may also include performing or forgoing performing (at 714) access procedures based on the response from RAN 105. For example, MME 301 may grant access to UE 101 when receiving a response from RAN 105 (e.g., a particular base station 113 of RAN 105) indicating that access should be allowed, and may forgo granting access to UE 101 when receiving a response from RAN 105 indicating that access should not be allowed. Performing the access procedures may include, for example, initiating, performing, or otherwise facilitating a handover from a RAN to which UE 101 is currently connected (e.g., RAN 103) to RAN 105, as discussed above.

Figure 8:
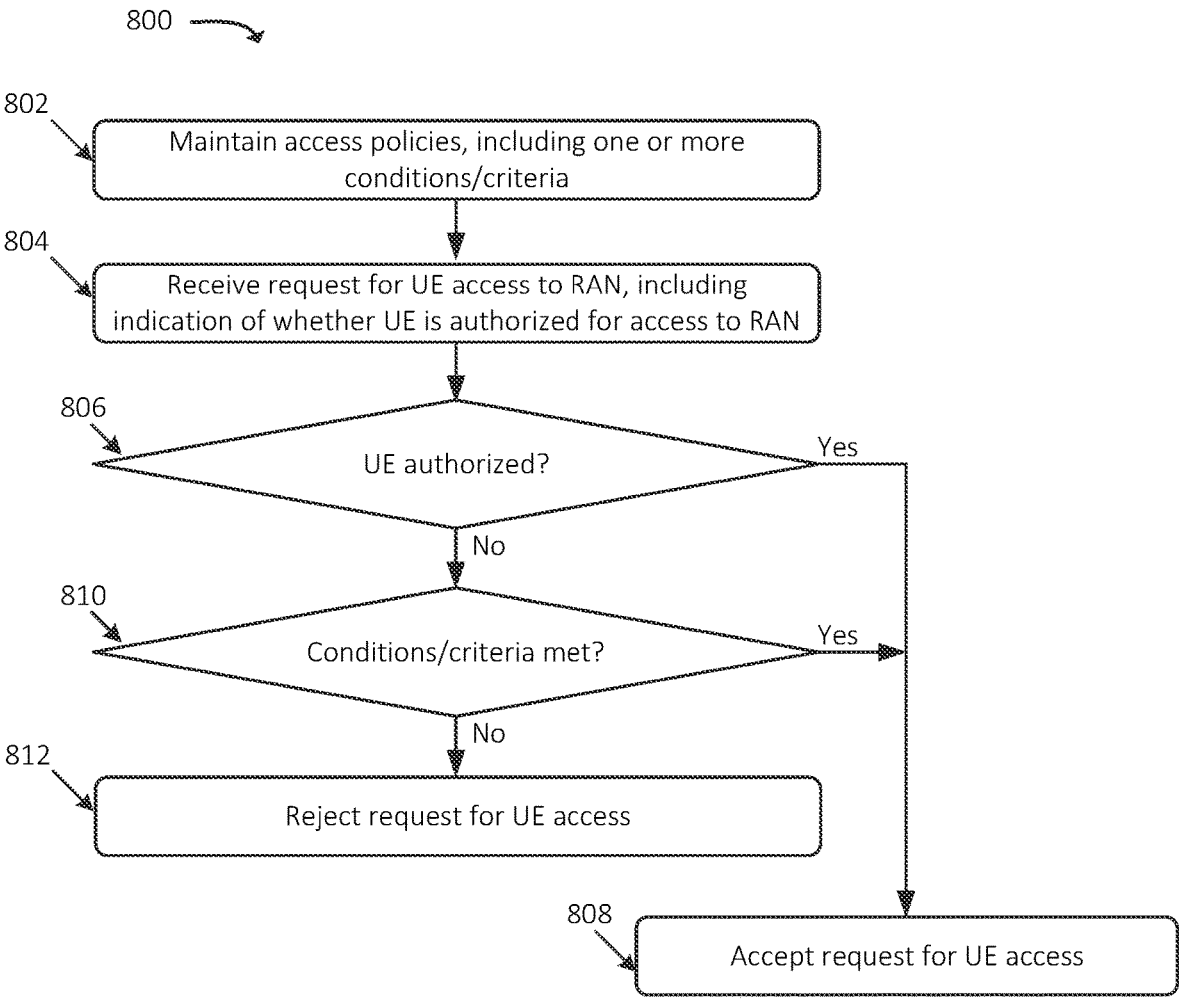

FIG. 8 illustrates an example process 800 for determining whether to allow access to a particular RAN 105. In some embodiments, some or all of process 800 may be performed by RAN 105 (e.g., by a particular base station 113 of RAN 105).

As shown, process 800 may include maintaining (at 802) access policies, including one or more conditions or criteria. As discussed above, the access policies may include an indication of whether only authorized UEs are allowed to access RAN 105 (e.g., a closed mode), or whether other UEs (e.g., unauthorized UEs, or UEs that are not specifically authorized to access RAN 105) are allowed to access RAN 105 if the additional conditions or criteria are met.

Process 800 may further include receiving (at 804) a request for a particular UE 101 to access RAN 105, including an indication of whether UE 101 is authorized for access to RAN 105. For example, a particular base station 113 of RAN 105 may receive such a request from MME 301, as discussed above. In some embodiments, the request may be or may include an inter-RAT handover request. The indication of whether UE 101 is authorized for access to RAN may have been determined by MME 301 (e.g., based on communicating with HSS 203 or in some other suitable manner). As discussed above, the authorization for access to RAN 105 may be determined based on whether an access list for RAN 105 includes an identifier of UE 101.

If request indicates that UE 101 is authorized for access to RAN 105 (at 806—YES), then RAN 105 may accept (at 808) the request for access by UE 101. For example, base station 113 may output a response to the request (e.g., to MME 301) indicating that the access by UE 101 should be allowed. As discussed above, MME 301 may then proceed to perform suitable access procedures, including initiating or facilitating a handover of UE 101 to RAN 105 (e.g., to base station 113).

On the other hand, if the request indicates that UE 101 is not authorized for access to RAN 105 (at 806—NO), then RAN 105 (e.g., base station 113) may determine (at 810) whether the additional conditions or criteria are met. For example, as discussed above, such conditions or criteria may include network load conditions associated with RAN 105 and/or base station 113 itself, temporal conditions, or other suitable conditions.

If the conditions or criteria are met, RAN 105 (e.g., base station 113) may accept (at 808) the request for UE access, as similarly discussed above. If, on the other hand, the conditions or criteria are not met, RAN 105 (e.g., base station 113) may reject (at 812) the request for UE access. For example, base station 113 may output a response (e.g., to MME 301) indicating that the UE should not be allowed to access RAN 105. In such a scenario, MME 301 may forgo performing access procedures to facilitate access to RAN 105 by UE 101, such as forgoing performing a handover procedure with respect to UE 101.

Figure 9:
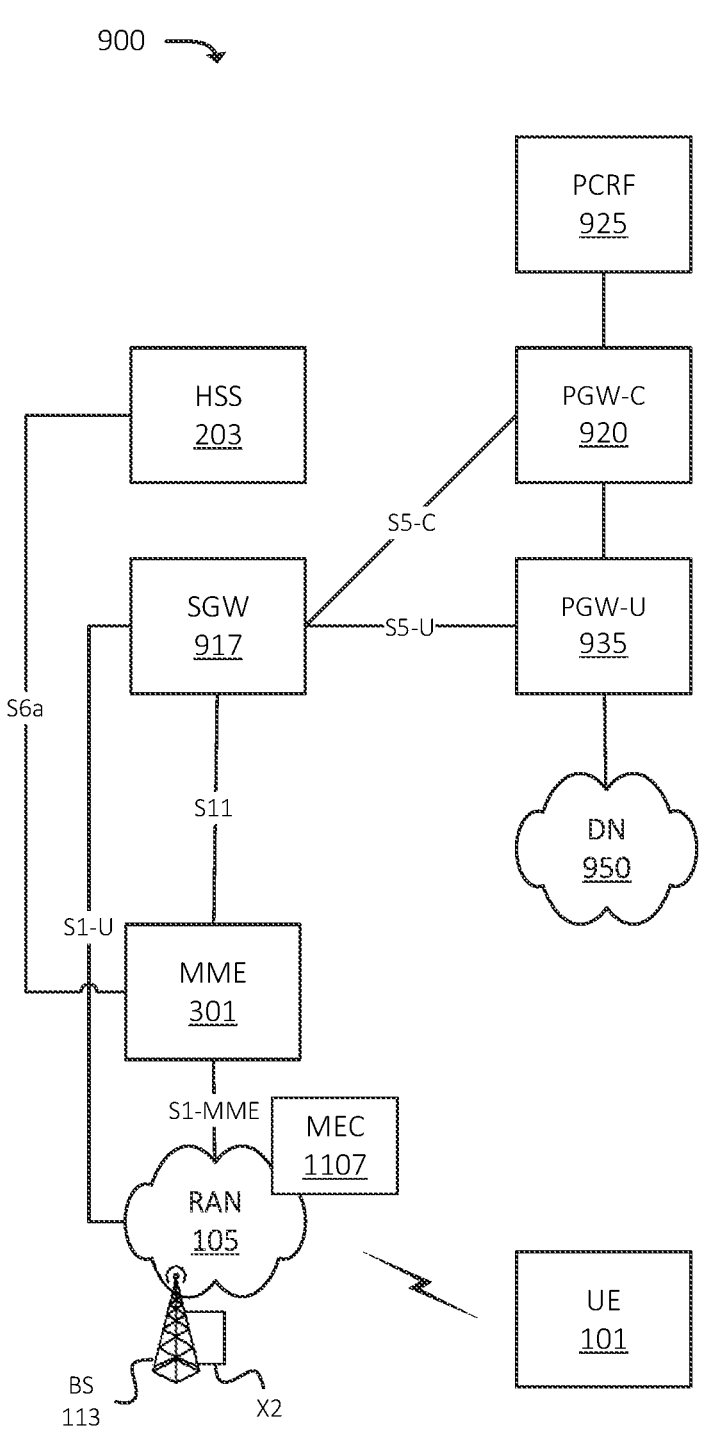
FIGS. 9 and 10 illustrate example environments in which one or more embodiments, described herein, may be implemented.

FIG. 9 illustrates an example environment 900, in which one or more embodiments may be implemented. In some embodiments, environment 900 may correspond to an EPS, and/or may include elements of an EPS. For example, portions of environment 900 may represent or may include EPC 111 and/or LTE RAN 105. As shown, environment 900 may include UE 101, RAN 105 (which may include one or more base stations 113), and various network functions such as MME 301, Serving Gateway ("SGW") 917, Packet Data Network ("PDN") Gateway ("PGW")-Control plane function ("PGW-C") 920, Policy Charging and Rules Function ("PCRF") 925, PGW-User plane function ("PGW-U") 935, and HSS 203. Environment 900 may also include one or more networks, such as Data Network ("DN") 950. Environment 900 may include one or more additional devices or systems communicatively coupled to one or more networks (e.g., DN 950.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc. In some implementations, one or more devices of environment 900 may be physically integrated in, and/or may be physically attached to, one or more other devices of environment 900. Alternatively, or additionally, one or more of the devices of environment 900 may perform one or more network functions described as being performed by another one or more of the devices of environment 900.

Elements of environment 900 may interconnect with each other and/or other devices via wired connections, wireless connections, or a combination of wired and wireless connections. Examples of interfaces or communication pathways between the elements of environment 900, as shown in FIG. 9, may include an S1-C interface, an S1-U interface, an S5-C interface, an S5-U interface, an S6a interface, an S11 interface, and/or one or more other interfaces.

UE 101 may include a computation and communication device, such as a wireless mobile communication device that is capable of communicating with RAN 105, RAN 103, and/or DN 950. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, a wearable device, a Machine-to-Machine ("M2M") device, or the like), a Fixed Wireless Access ("FWA") device, or another type of mobile computation and communication device. UE 101 may send traffic to and/or receive traffic (e.g., user plane traffic) from DN 950 via RAN 105, and/or PGW-U 935.

RAN 105 may be, or may include, a LTE RAN that includes one or more base stations 113 (e.g., one or more eNBs, HeNBs, femtocells, or the like), via which UE 101 may communicate with one or more other elements of environment 900. UE 101 may communicate with RAN 105 via an air interface (e.g., as provided by base station 113). For instance, RAN 105 may receive traffic (e.g., user plane traffic such as voice call traffic, data traffic, messaging traffic, signaling traffic, etc.) from UE 101 via the air interface, and may communicate the traffic to PGW-U 935 (e.g., via SGW 917) and/or one or more other devices or networks. Further, RAN 105 may receive signaling traffic, control plane traffic, etc. from UE 101 via the air interface, and may communicate such signaling traffic, control plane traffic, etc. to MME 301 and/or one or more other devices or networks. Additionally, RAN 105 may receive traffic intended for UE 101 (e.g., from PGW-U 935, MME 301, SGW 917, and/or one or more other devices or networks) and may communicate the traffic to UE 101 via the air interface.

MME 301 may include one or more devices, systems, Virtualized Network Functions ("VNFs"), Cloud-Native Network Functions ("CNFs"), etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 105 and/or base stations 113, and/or to perform other operations.

SGW 917 may include one or more devices, systems, VNFs, CNFs, etc., that aggregate traffic received from one or more base stations 113 and send the aggregated traffic to an external network or device via PGW-U 935. Additionally, SGW 917 may aggregate traffic received from one or more PGW-Us 935 and may send the aggregated traffic to one or more base stations 113. SGW 917 may operate as an anchor for the user plane during inter-eNB handovers and as an anchor for mobility between different telecommunication networks or RANs (e.g., RANs 103 and 105).

PGW-C 920 may include one or more devices, systems, VNFs, CNFs, etc., that gather, process, store, and/or provide information in a manner described herein. PGW-C 920 may, for example, facilitate the establishment of communication sessions on behalf of UE 101. In some embodiments, the establishment of communications sessions may be performed in accordance with one or more policies provided by PCRF 925.

PCRF 925 may include one or more devices, systems, VNFs, CNFs, etc., that aggregate information to and from the 5G network and/or other sources. PCRF 925 may receive information regarding policies and/or subscriptions from one or more sources, such as subscriber databases and/or from one or more users (such as, for example, an administrator associated with PCRF 925).

PGW-U 935 may include one or more devices, systems, VNFs, CNFs, etc., that receive, store, and/or provide data (e.g., user plane data). For example, PGW-U 935 may receive user plane data (e.g., voice call traffic, data traffic, etc.), destined for UE 101, from DN 950, and may forward the user plane data toward UE 101 (e.g., via RAN 103, PGW-C 920, and/or one or more other devices). Similarly, PGW-U 935 may receive traffic from UE 101 (e.g., via RAN 105, PGW-C 920, and/or one or more other devices), and may forward the traffic toward DN 950. In some embodiments, PGW-U 935 may communicate with PGW-C 920, regarding user plane data processed by PGW-U 935.

HSS 203 may include one or more devices, systems, VNFs, CNFs, etc., that manage, update, and/or store, in one or more memory devices associated with HSS 203, profile information associated with a subscriber. HSS 203 and/or one or more other suitable devices or systems (e.g., an Authentication, Authorization, Accounting ("AAA") system) may perform authentication, authorization, and/or accounting operations associated with the subscriber and/or a communication session with UE 101.

DN 950 may include one or more wired and/or wireless networks. For example, DN 950 may include an Internet Protocol ("IP")-based PDN, a wide area network ("WAN") such as the Internet, a private enterprise network, and/or one or more other networks. UE 101 may communicate, through DN 950, with data servers, other UEs 101, and/or to other servers or applications that are coupled to DN 950. DN 950 may be connected to one or more other networks, such as a public switched telephone network ("PSTN"), a PLMN, and/or another network. DN 950 may be connected to one or more devices, such as content providers, applications, web servers, and/or other devices, with which UE 101 may communicate.

Figure 10:
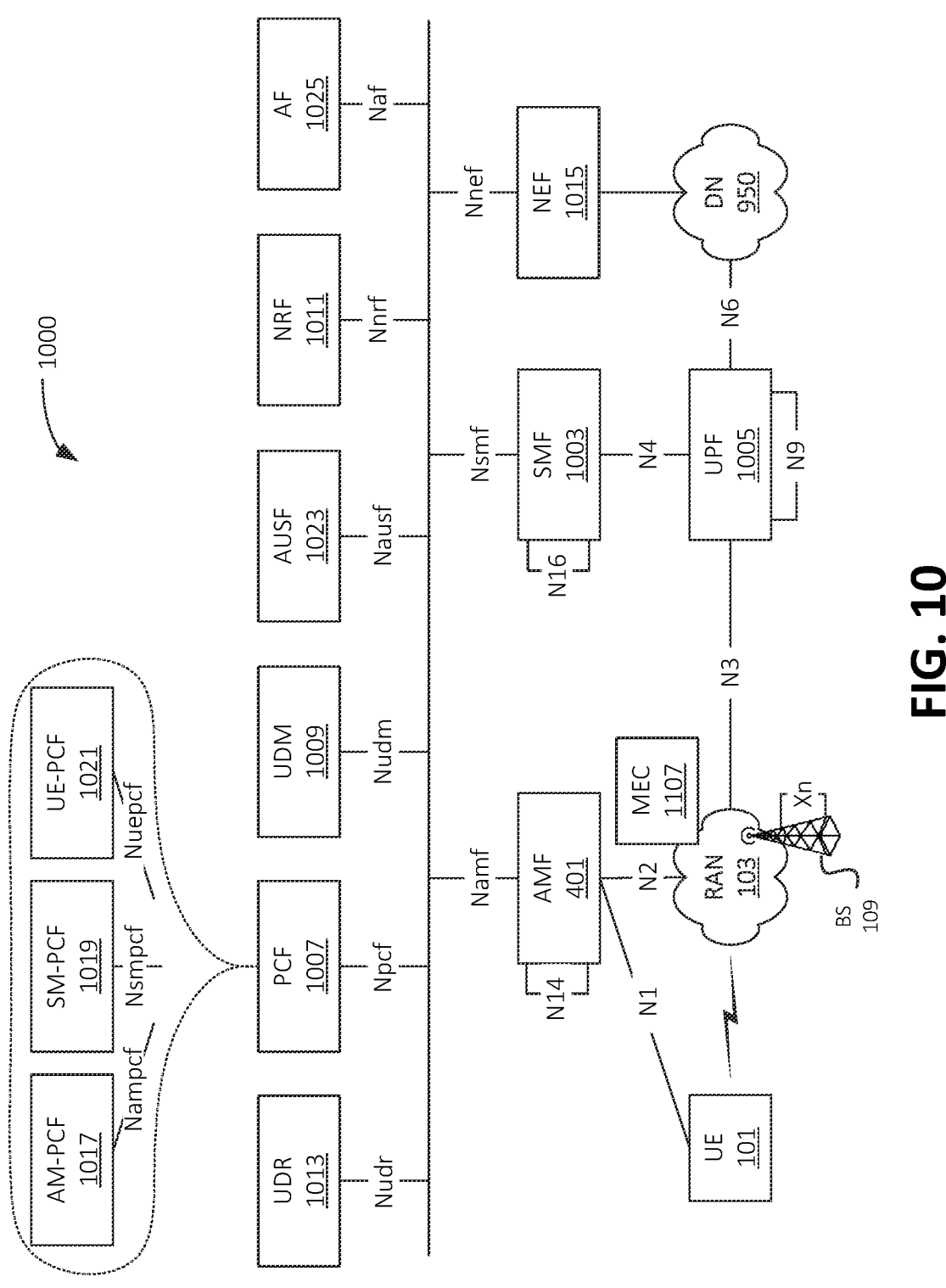

FIG. 10 illustrates another example environment 1000, in which one or more embodiments may be implemented. In some embodiments, environment 1000 may correspond to a 5GS, and/or may include elements of a 5GS. In some embodiments, environment 1000 may correspond to a 5G SA architecture. In some embodiments, environment 1000 may include a 5GC, in which 5GC network elements perform one or more operations described herein.

As shown, environment 1000 may include UE 101, RAN 103 (which may include one or more base stations 109) and various network functions, which may be implemented as VNFs, CNFs, etc. Such network functions may include AMF 401, Session Management Function ("SMF") 1003, User Plane Function ("UPF") 1005, Policy Control Function ("PCF") 1007, Unified Data Management function ("UDM") 1009, Network Repository Function ("NRF") 1011, Unified Data Repository ("UDR") 1013, Network Exposure Function ("NEF") 1015, Authentication Server Function ("AUSF") 1023, and Application Function ("AF") 1025. Environment 1000 may also include or may be communicatively coupled to one or more networks, such as Data Network DN 950.

The example shown in FIG. 10 illustrates one instance of each network component or function (e.g., one instance of SMF 1003, UPF 1005, PCF 1007, UDM 1009, AUSF 1023, etc.). In practice, environment 1000 may include multiple instances of such components or functions. For example, in some embodiments, environment 1000 may include multiple "slices" of a core network, where each slice includes a discrete and/or logical set of network functions (e.g., one slice may include a first instance of SMF 1003, PCF 1007, UPF 1005, etc., while another slice may include a second instance of SMF 1003, PCF 1007, UPF 1005, etc.). Additionally, or alternatively, one or more of the network functions of environment 1000 may implement multiple network slices. The different slices may provide differentiated levels of service, such as service in accordance with different QoS parameters.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. In some implementations, one or more devices of environment 1000 may be physically integrated in, and/or may be physically attached to, one or more other devices of environment 1000. Alternatively, or additionally, one or more of the devices of environment 1000 may perform one or more network functions described as being performed by another one or more of the devices of environment 1000.

Elements of environment 1000 may interconnect with each other and/or other devices via wired connections, wireless connections, or a combination of wired and wireless connections. Examples of interfaces or communication pathways between the elements of environment 1000, as shown in FIG. 10, may include interfaces shown in FIG. 10 and/or one or more interfaces not explicitly shown in FIG. 10. These interfaces may include interfaces between specific network functions, such as an N1 interface, an N2 interface, an N3 interface, an N6 interface, an N9 interface, an N14 interface, an N16 interface, and/or one or more other interfaces. In some embodiments, one or more elements of environment 1000 may communicate via a service-based architecture ("SBA"), in which a routing mesh or other suitable routing mechanism may route communications to particular network functions based on interfaces or identifiers associated with such network functions. Such interfaces may include or may be referred to as Service-Based Interfaces ("SBIs"), including an Namf interface (e.g., indicating communications to be routed to AMF 401), an Nudm interface (e.g., indicating communications to be routed to UDM 1009), an Npcf interface, an Nupf interface, an Nnef interface, an Nsmf interface, an Nnrf interface, an Nudr interface, an Naf interface, and/or one or more other SBIs.

UPF 1005 may include one or more devices, systems, VNFs, CNFs, etc., that receive, route, process, and/or forward traffic (e.g., user plane traffic). As discussed above, UPF 1005 may communicate with UE 101 via one or more communication sessions, such as PDU sessions. Such PDU sessions may be associated with a particular network slice or other suitable QoS parameters, as noted above. UPF 1005 may receive downlink user plane traffic (e.g., voice call traffic, data traffic, etc. destined for UE 101) from DN 950, and may forward the downlink user plane traffic toward UE 101 (e.g., via RAN 103). In some embodiments, multiple UPFs 1005 may be deployed (e.g., in different geographical locations), and the delivery of content to UE 101 may be coordinated via the N9 interface. Similarly, UPF 1005 may receive uplink traffic from UE 101 (e.g., via RAN 103), and may forward the traffic toward DN 950. In some embodiments, UPF 1005 may implement, may be implemented by, may be communicatively coupled to, and/or may otherwise be associated with UPF/PGW-U 935. In some embodiments, UPF 1005 may communicate (e.g., via the N4 interface) with SMF 1003, regarding user plane data processed by UPF 1005 (e.g., to provide analytics or reporting information, to receive policy and/or authorization information, etc.).

PCF 1007 may include one or more devices, systems, VNFs, CNFs, etc., that aggregate, derive, generate, etc. policy information associated with the 5GC and/or UEs 101 that communicate via the 5GC and/or RAN 103. PCF 1007 may receive information regarding policies and/or subscriptions from one or more sources, such as subscriber databases (e.g., UDM 1009, UDR 1013, etc.), and/or from one or more users such as, for example, an administrator associated with PCF 1007. In some embodiments, the functionality of PCF 1007 may be split into multiple network functions or subsystems, such as access and mobility PCF ("AM-PCF") 1017, session management PCF ("SM-PCF") 1019, UE PCF ("UE-PCF") 1021, and so on. Such different "split" PCFs may be associated with respective SBIs (e.g., AM-PCF 1017 may be associated with an Nampcf SBI, SM-PCF 1019 may be associated with an Nsmpcf SBI, UE-PCF 1021 may be associated with an Nuepcf SBI, and so on) via which other network functions may communicate with the split PCFs. The split PCFs may maintain information regarding policies associated with different devices, systems, and/or network functions.

NRF 1011 may include one or more devices, systems, VNFs, CNFs, etc. that maintain routing and/or network topology information associated with the 5GC. For example, NRF 1011 may maintain and/or provide IP addresses of one or more network functions, routes associated with one or more network functions, discovery and/or mapping information associated with particular network functions or network function instances (e.g., whereby such discovery and/or mapping information may facilitate the SBA), and/or other suitable information.

UDR 1013 may include one or more devices, systems, VNFs, CNFs, etc. that provide user and/or subscriber information, based on which PCF 1007 and/or other elements of environment 1000 may determine access policies, QoS policies, charging policies, or the like. In some embodiments, UDR 1013 may receive such information from UDM 1009 and/or one or more other sources.

NEF 1015 include one or more devices, systems, VNFs, CNFs, etc. that provide access to information, application programming interfaces ("APIs"), and/or other operations or mechanisms of the 5GC to devices or systems that are external to the 5GC. NEF 1015 may maintain authorization and/or authentication information associated with such external devices or systems, such that NEF 1015 is able to provide information, that is authorized to be provided, to the external devices or systems. Such information may be received from other network functions of the 5GC (e.g., as authorized by an administrator or other suitable entity associated with the 5GC), such as SMF 1003, UPF 1005, a charging function ("CHF") of the 5GC, and/or other suitable network function. NEF 1015 may communicate with external devices or systems via DN 950 and/or other suitable communication pathways.

While environment 1000 is described in the context of a 5GC, as noted above, environment 1000 may, in some embodiments, include or implement one or more other types of core networks. For example, in some embodiments, environment 1000 may be or may include a converged packet core, in which one or more elements may perform some or all of the functionality of one or more 5GC network functions and/or one or more EPC network functions. For example, in some embodiments, AMF 401 may include, may implement, may be implemented by, and/or may otherwise be associated with MME 301; SMF 1003 may include, may implement, may be implemented by, and/or may otherwise be associated with SGW 917; PCF 1007 may include, may implement, may be implemented by, and/or may otherwise be associated with a PCRF; NEF 1015 may include, may implement, may be implemented by, and/or may otherwise be associated with a Service Capability Exposure Function ("SCEF"); and so on.

AUSF 1023 may perform authentication, authorization, and/or accounting operations associated with one or more UEs 101 and/or one or more communication sessions associated with one or more UEs 101. AF 1025 may include one or more devices, systems, VNFs, CNFs, etc., that receive, store, and/or provide information that may be used in determining parameters (e.g., quality of service parameters, charging parameters, or the like) for certain applications.

Figure 11:
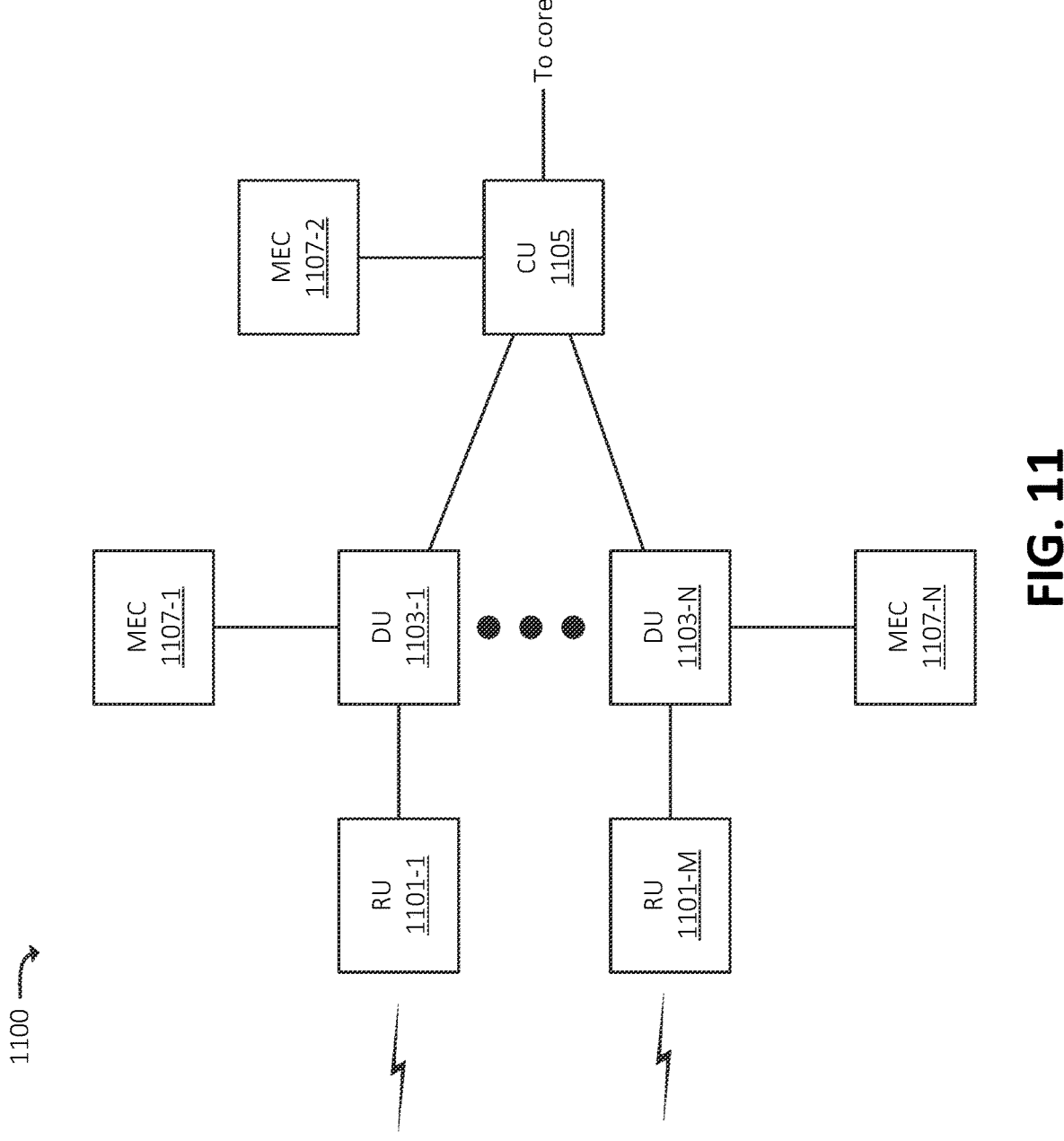
FIG. 11 illustrates an example arrangement of a radio access network ("RAN"), in accordance with some embodiments.

FIG. 11 illustrates an example RAN environment 1100, which may be included in and/or implemented by one or more RANs (e.g., RAN 103, RAN 105, or some other RAN). In some embodiments, a particular RAN 103 may include one RAN environment 1100. In some embodiments, a particular RAN 103 may include multiple RAN environments 1100. In some embodiments, RAN environment 1100 may correspond to a particular base station 109 of RAN 103. In some embodiments, RAN environment 1100 may correspond to multiple base stations 109. In some embodiments, RAN environment 1100 may correspond to one or more other types of base stations of one or more other types of RANs. As shown, RAN environment 1100 may include Central Unit ("CU") 1105, one or more Distributed Units ("DUs") 1103-1 through 1103-N (referred to individually as "DU 1103," or collectively as "DUs 1103"), and one or more Radio Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 11, such as AMF 401 and/or UPF 1005). In the uplink direction (e.g., for traffic from UEs 101 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular UE 101, and may determine which DU(s) 1103 should receive the downlink traffic. DU 1103 may include one or more devices that transmit traffic between a core network (e.g., via CU 1105) and UE 101 (e.g., via a respective RU 1101). DU 1103 may, for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 101.

RU 1101 may include hardware circuitry (e.g., one or more RF transceivers, antennas, radios, and/or other suitable hardware) to communicate wirelessly (e.g., via an RF interface) with one or more UEs 101, one or more other DUs 1103 (e.g., via RUs 1101 associated with DUs 1103), and/or any other suitable type of device. In the uplink direction, RU 1101 may receive traffic from UE 101 and/or another DU 1103 via the RF interface and may provide the traffic to DU 1103. In the downlink direction, RU 1101 may receive traffic from DU 1103, and may provide the traffic to UE 101 and/or another DU 1103.

One or more elements of RAN environment 1100 may, in some embodiments, be communicatively coupled to one or more Multi-Access/Mobile Edge Computing ("MEC") devices, referred to sometimes herein simply as a "MECs," 1107. For example, DU 1103-1 may be communicatively coupled to MEC 1107-1, DU 1103-N may be communicatively coupled to MEC 1107-N, CU 1105 may be communicatively coupled to MEC 1107-2, and so on. MECs 1107 may include hardware resources (e.g., configurable or provisionable hardware resources) that may be configured to provide services and/or otherwise process traffic to and/or from UE 101, via a respective RU 1101.

For example, DU 1103-1 may route some traffic, from UE 101, to MEC 1107-1 instead of to a core network via CU 1105. MEC 1107-1 may process the traffic, perform one or more computations based on the received traffic, and may provide traffic to UE 101 via RU 1101-1. In some embodiments, MEC 1107 may include, and/or may implement, some or all of the functionality described above with respect to UPF 1005, AF 1025, and/or one or more other devices, systems, VNFs, CNFs, etc. In this manner, ultra-low latency services may be provided to UE 101, as traffic does not need to traverse DU 1103, CU 1105, links between DU 1103 and CU 1105, and an intervening backhaul network between RAN environment 1100 and the core network.

Figure 12:
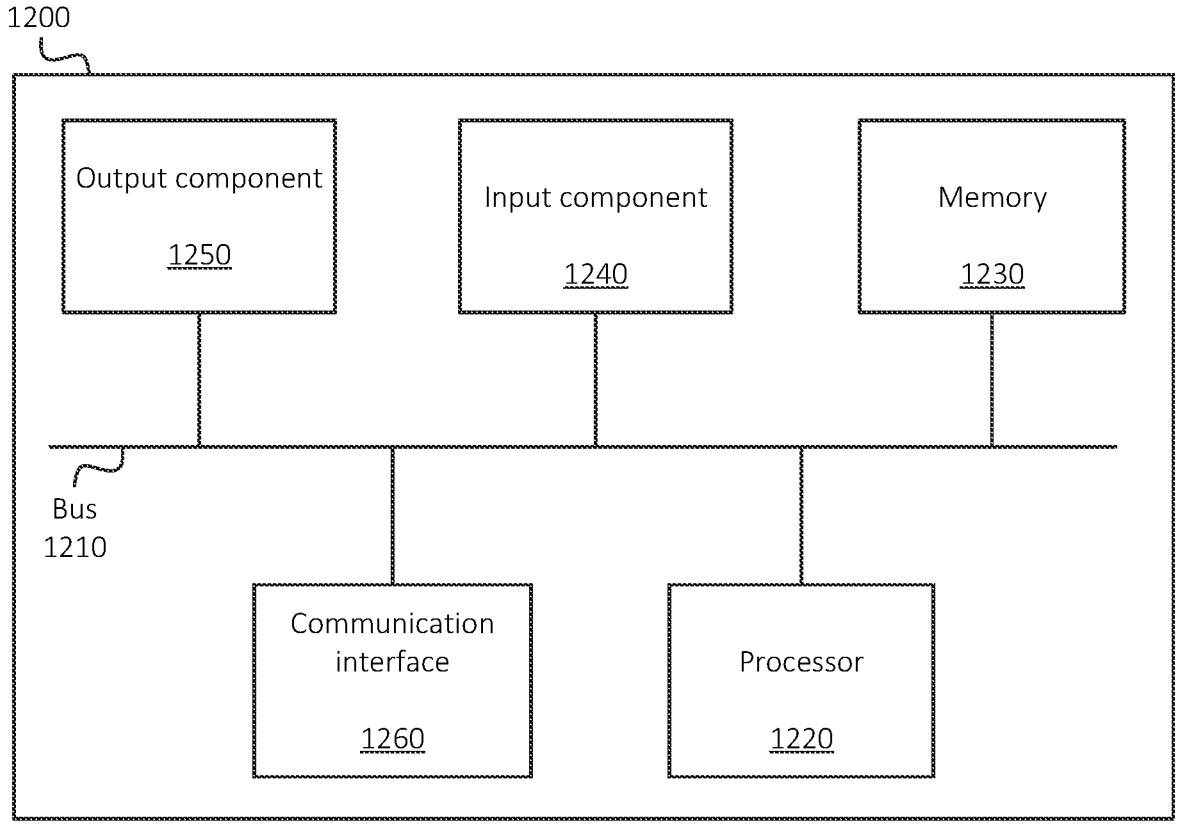
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, a set of provisioned hardware resources of a cloud computing system, or other suitable type of hardware that interprets and/or executes instructions (e.g., processor-executable instructions). In some embodiments, processor 1220 may be or may include one or more hardware processors. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to input component 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing instructions, such as software instructions, processor-executable instructions, etc. stored in a computer-readable medium, such as memory 1230. A computer-readable medium may be defined as a non-transitory memory device. A memory device may include space within a single physical memory device or spread across multiple physical memory devices. The instructions may be read into memory 1230 from another computer-readable medium or from another device. The instructions stored in memory 1230 may be processor-executable instructions that cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-4, 5A, 5B, 6A-6C, 7, and 8), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:
1. A device, comprising:
one or more processors configured to:
receive a first request to access a particular radio access network (RAN), wherein the first request includes an identifier of a particular User Equipment (UE);
determine, based on the identifier of the particular UE, that an access policy for the particular RAN does not indicate that the particular UE is authorized to access the particular RAN;
output a second request to the particular RAN, wherein the second request includes:
the identifier of the particular UE, and

an indication that the access policy for the particular RAN does not indicate that the particular UE is authorized to access the particular RAN; and
receive a response to the second request, wherein the particular RAN determines the response based on:
the indication that the access policy for the particular RAN does not indicate that the particular UE is authorized to access the particular RAN, and
one or more conditions,
wherein the response includes one of:
a first indication that the particular UE is allowed to access the particular RAN when the one or more conditions are met, or
a second indication that the particular UE is not allowed to access the particular RAN when the one or more conditions are not met.
2. The device of claim 1, wherein the one or more conditions include load metrics associated with the particular RAN.
3. The device of claim 1, wherein the one or more conditions include one or more temporal conditions.
4. The device of claim 1, wherein the particular RAN implements a Closed Subscriber Group (CSG) technique.
5. The device of claim 1, wherein the particular RAN includes one or more Home evolved Node Bs (HeNBs), wherein the first request to access the particular RAN includes a request to access a particular HeNB of the particular RAN.
6. The device of claim 1, wherein the particular RAN is a first RAN, wherein the first request to access the particular RAN includes a handover request of the particular UE from a second RAN.
7. The device of claim 6, wherein the first RAN is communicatively coupled to a first core network, and wherein the second RAN is communicatively coupled to a second core network.
8. A non-transitory computer-readable medium, storing a plurality of processor-executable instructions to:
receive a first request to access a particular radio access network (RAN), wherein the first request includes an identifier of a particular User Equipment (UE);
determine, based on the identifier of the particular UE, that an access policy for the particular RAN does not indicate that the particular UE is authorized to access the particular RAN;
output a second request to the particular RAN, wherein the second request includes:
the identifier of the particular UE, and
an indication that the access policy for the particular RAN does not indicate that the particular UE is authorized to access the particular RAN; and
receive a response to the second request, wherein the particular RAN determines the response based on:
the indication that the access policy for the particular RAN does not indicate that the particular UE is authorized to access the particular RAN, and
one or more conditions,
wherein the response includes one of:
a first indication that the particular UE is allowed to access the particular RAN when the one or more conditions are met, or
a second indication that the particular UE is not allowed to access the particular RAN when the one or more conditions are not met.
9. The non-transitory computer-readable medium of claim 8, wherein the one or more conditions include load metrics associated with the particular RAN.

10. The non-transitory computer-readable medium of claim 8, wherein the one or more conditions include one or more temporal conditions.

11. The non-transitory computer-readable medium of claim 8, wherein the particular RAN implements a Closed Subscriber Group (CSG) technique.

12. The non-transitory computer-readable medium of claim 8, wherein the particular RAN includes one or more Home evolved Node Bs (HeNBs), wherein the first request to access the particular RAN includes a request to access a particular HeNB of the particular RAN.

13. The non-transitory computer-readable medium of claim 8, wherein the particular RAN is a first RAN, wherein the first request to access the particular RAN includes a handover request of the particular UE from a second RAN.

14. The non-transitory computer-readable medium of claim 13, wherein the first RAN is communicatively coupled to a first core network, and wherein the second RAN is communicatively coupled to a second core network.

15. A method, comprising:

receiving a first request to access a particular radio access network (RAN), wherein the first request includes an identifier of a particular User Equipment (UE);

determining, based on the identifier of the particular UE, that an access policy for the particular RAN does not indicate that the particular UE is authorized to access the particular RAN;

outputting a second request to the particular RAN, wherein the second request includes:

the identifier of the particular UE, and an indication that the access policy for the particular RAN does not indicate that the particular UE is authorized to access the particular RAN; and receiving a response to the second request, wherein the particular RAN determines the response based on:

the indication that the access policy for the particular RAN does not indicate that the particular UE is authorized to access the particular RAN, and one or more conditions, wherein the response includes one of:

a first indication that the particular UE is allowed to access the particular RAN when the one or more conditions are met, or a second indication that the particular UE is not allowed to access the particular RAN when the one or more conditions are not met.

16. The method of claim 15, wherein the one or more conditions include load metrics associated with the particular RAN.

17. The method of claim 15, wherein the one or more conditions include one or more temporal conditions.

18. The method of claim 15, wherein the particular RAN implements a Closed Subscriber Group (CSG) technique.

19. The method of claim 15, wherein the particular RAN includes one or more Home evolved Node Bs (HeNBs), wherein the first request to access the particular RAN includes a request to access a particular HeNB of the particular RAN.

20. The method of claim 15, wherein the particular RAN is a first RAN that is communicatively coupled to a first core network, wherein the first request to access the particular RAN includes a handover request of the particular UE from a second RAN that is communicatively coupled to a second core network.

* * * * *